(12) United States Patent
Maeda et al.

(10) Patent No.: US 7,787,364 B2
(45) Date of Patent: Aug. 31, 2010

(54) CONTROL SCHEME FOR STANDBY CHANNEL ROUTE

(75) Inventors: Takuya Maeda, Kawasaki (JP); Masaru Tanaka, Kawasaki (JP); Masaki Deguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 11/779,421

(22) Filed: Jul. 18, 2007

(65) Prior Publication Data

US 2008/0056294 A1    Mar. 6, 2008

(30) Foreign Application Priority Data

Aug. 30, 2006    (JP) ............... 2006-233076

(51) Int. Cl.
   *H04L 12/26*    (2006.01)
(52) U.S. Cl. ............................................. 370/220
(58) Field of Classification Search ............... None
   See application file for complete search history.

(56) References Cited

U.S. PATENT DOCUMENTS

| | | | | |
|---|---|---|---|---|
| 6,163,525 | A * | 12/2000 | Bentall et al. | 370/227 |
| 6,665,263 | B1 * | 12/2003 | Kawabata et al. | 370/219 |
| 6,738,345 | B1 * | 5/2004 | Williamson | 370/217 |
| 6,901,048 | B1 * | 5/2005 | Wang et al. | 370/228 |
| 6,912,221 | B1 * | 6/2005 | Zadikian et al. | 370/395.21 |
| 6,952,395 | B1 * | 10/2005 | Manoharan et al. | 370/219 |
| 7,047,311 | B2 * | 5/2006 | Oishi et al. | 709/233 |
| 7,154,858 | B1 * | 12/2006 | Zhang et al. | 370/252 |
| 7,212,495 | B2 * | 5/2007 | Karri et al. | 370/238 |
| 7,436,855 | B2 * | 10/2008 | Lee et al. | 370/471 |
| 7,450,496 | B1 * | 11/2008 | Doverspike et al. | 370/217 |
| 7,457,233 | B1 * | 11/2008 | Gan et al. | 370/216 |
| 7,643,407 | B2 * | 1/2010 | Benvenuti et al. | 370/217 |
| 7,652,983 | B1 * | 1/2010 | Li et al. | 370/217 |
| 7,680,029 | B2 * | 3/2010 | Kano et al. | 370/218 |
| 7,688,720 | B2 * | 3/2010 | Doverspike et al. | 370/228 |
| 7,697,455 | B2 * | 4/2010 | Sadanada | 370/254 |
| 7,710,863 | B2 * | 5/2010 | Kano et al. | 370/217 |
| 2003/0117950 | A1 * | 6/2003 | Huang | 370/220 |
| 2004/0073650 | A1 * | 4/2004 | Nakamura | 709/223 |
| 2004/0120705 | A1 * | 6/2004 | Friskney et al. | 398/5 |
| 2004/0233843 | A1 * | 11/2004 | Barker | 370/225 |

(Continued)

FOREIGN PATENT DOCUMENTS

JP    10-303932    11/1998

*Primary Examiner*—Ayaz R Sheikh
*Assistant Examiner*—Timothy J Weidner
(74) *Attorney, Agent, or Firm*—Katten Muchin Rosenman LLP

(57) ABSTRACT

A control scheme is disclosed for controlling establishment of a standby channel route for an active channel route in a GMPLS network made up of plural transmission apparatuses. The standby channel route is formed by at least one standby channel route transmission apparatus, an ingress transmission apparatus, and an egress transmission apparatus. The control scheme involves transmitting from the ingress transmission apparatus to the standby channel route transmission apparatus a standby channel path establishing message including pre-reserve information for directing the standby channel route transmission apparatus to pre-reserve a standby channel path of the standby channel route, and setting the standby channel path to pre-reserved status within a band management table of the standby channel route transmission apparatus. The standby channel path that is set to pre-reserved status within the standby channel route transmission apparatus is externally recognized as free by the other transmission apparatuses.

9 Claims, 26 Drawing Sheets

U.S. PATENT DOCUMENTS

2004/0246972 A1* 12/2004 Wang et al. .............. 370/395.5
2005/0237950 A1* 10/2005 Yuan et al. ................. 370/255
2008/0095045 A1* 4/2008 Owens et al. ............... 370/220
2008/0130489 A1* 6/2008 Chao et al. ................. 370/219

* cited by examiner

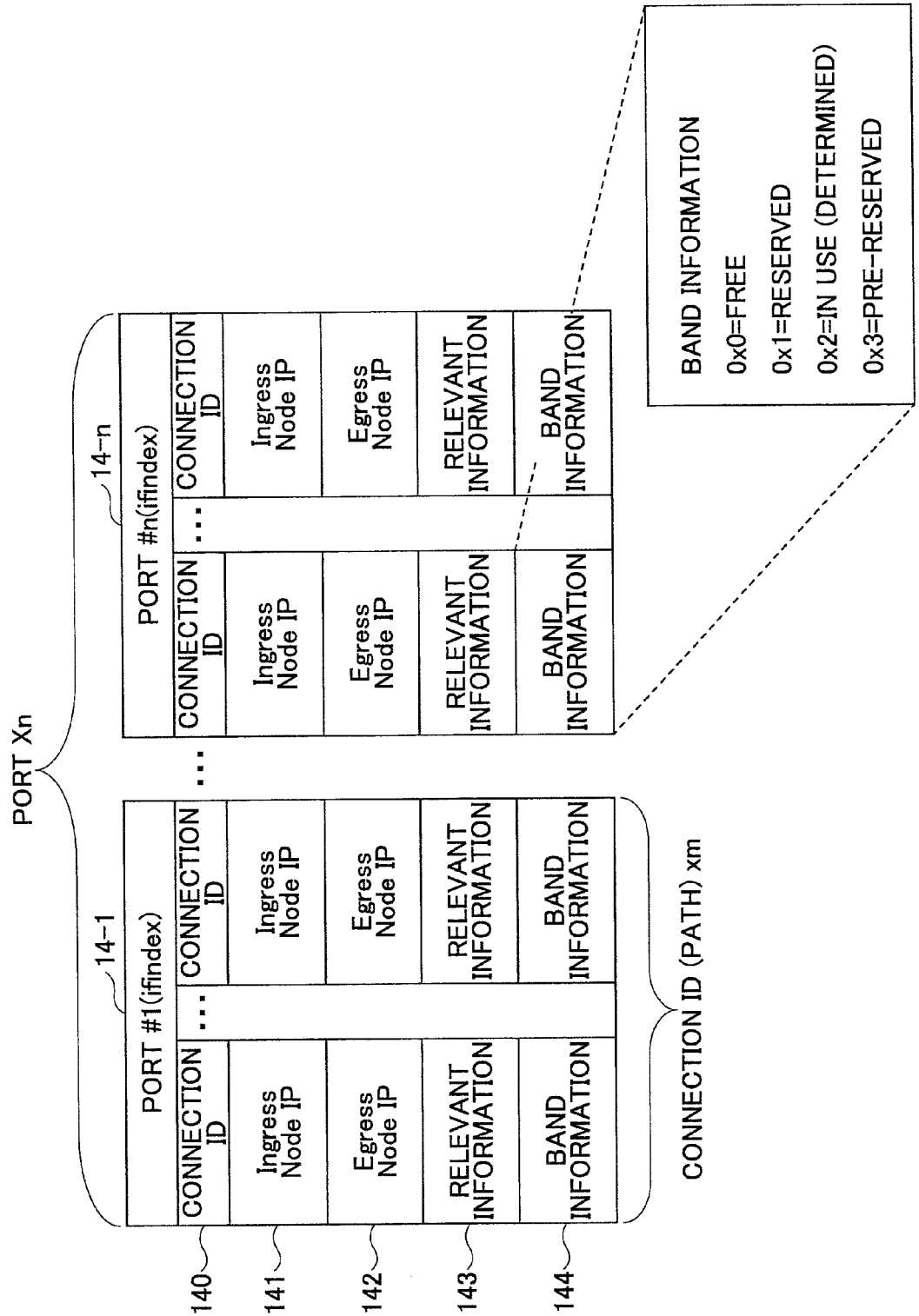

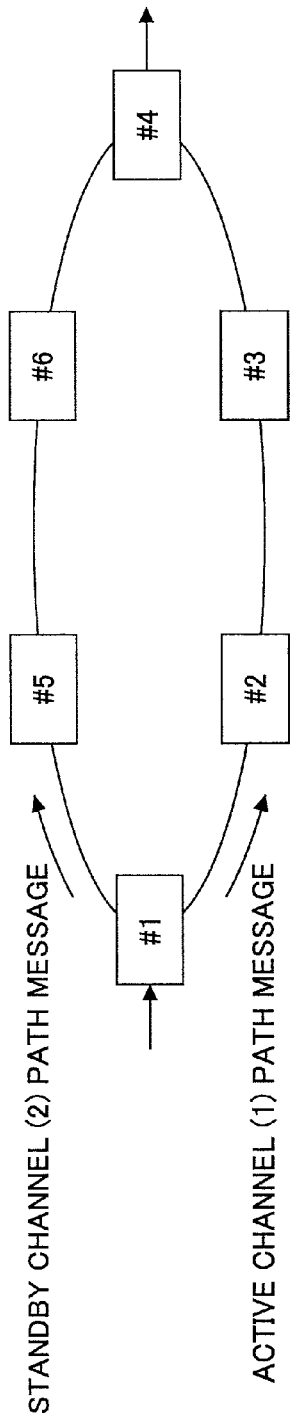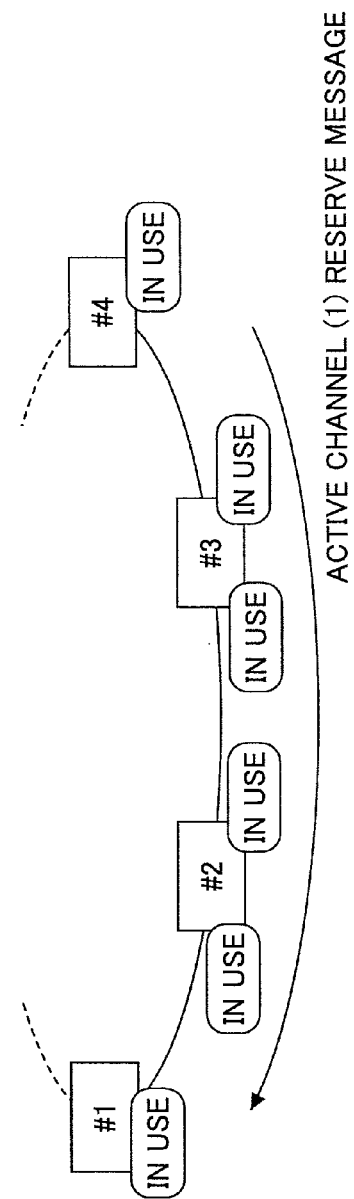

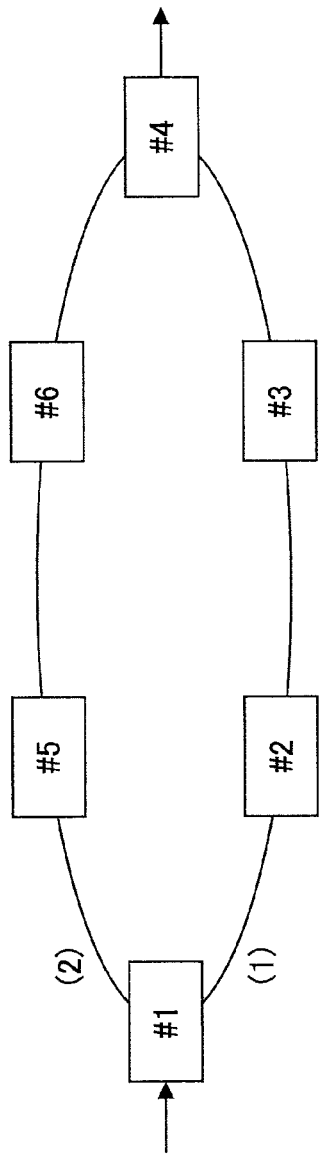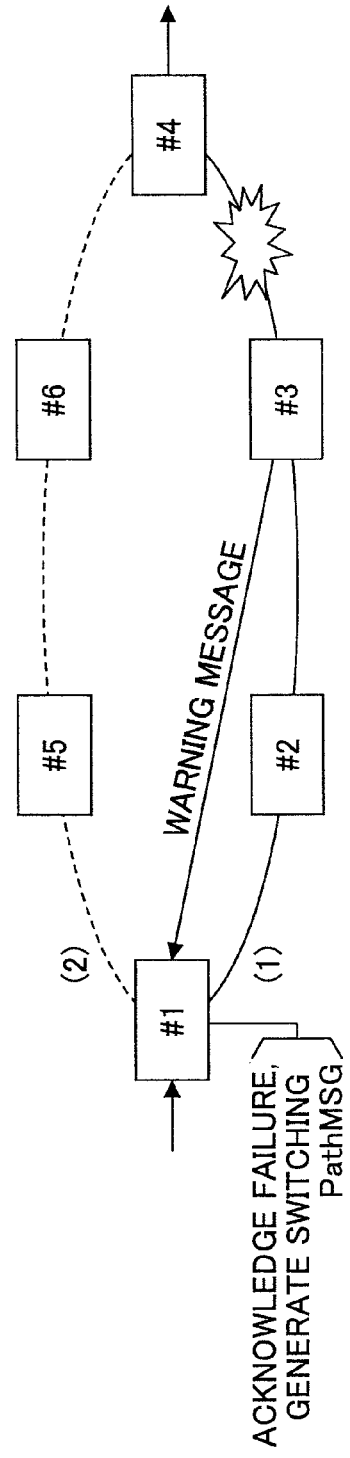

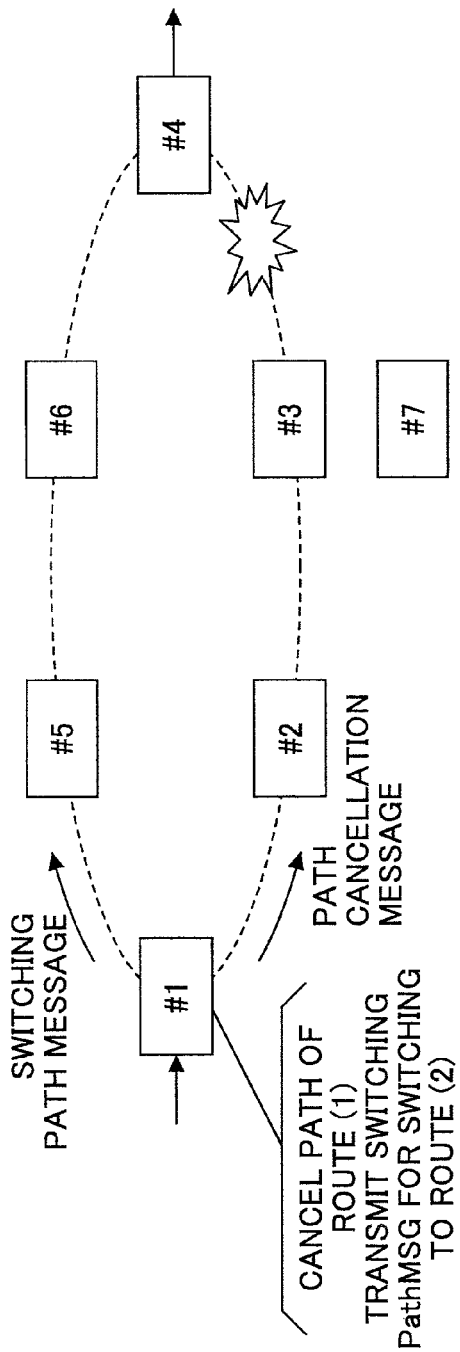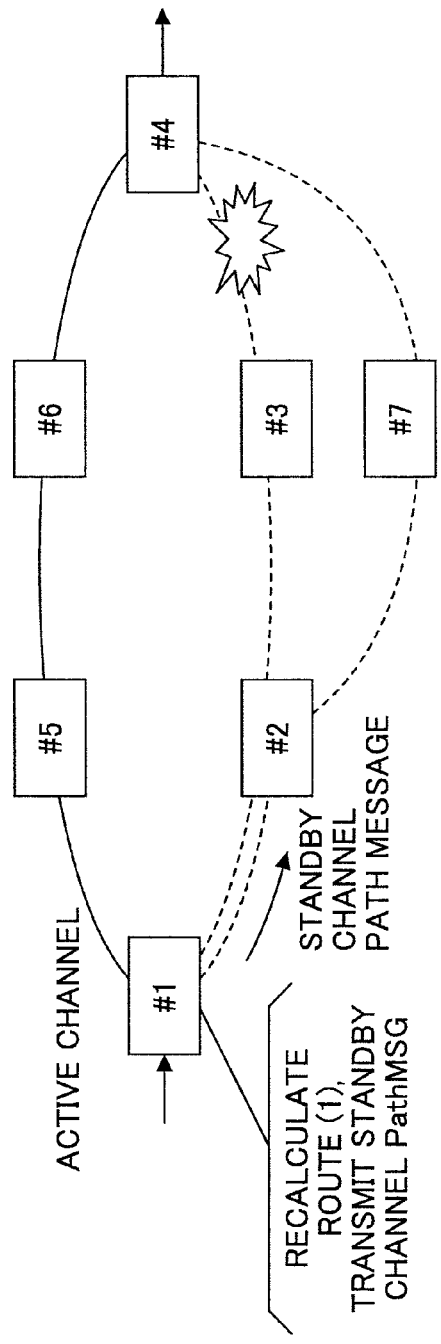

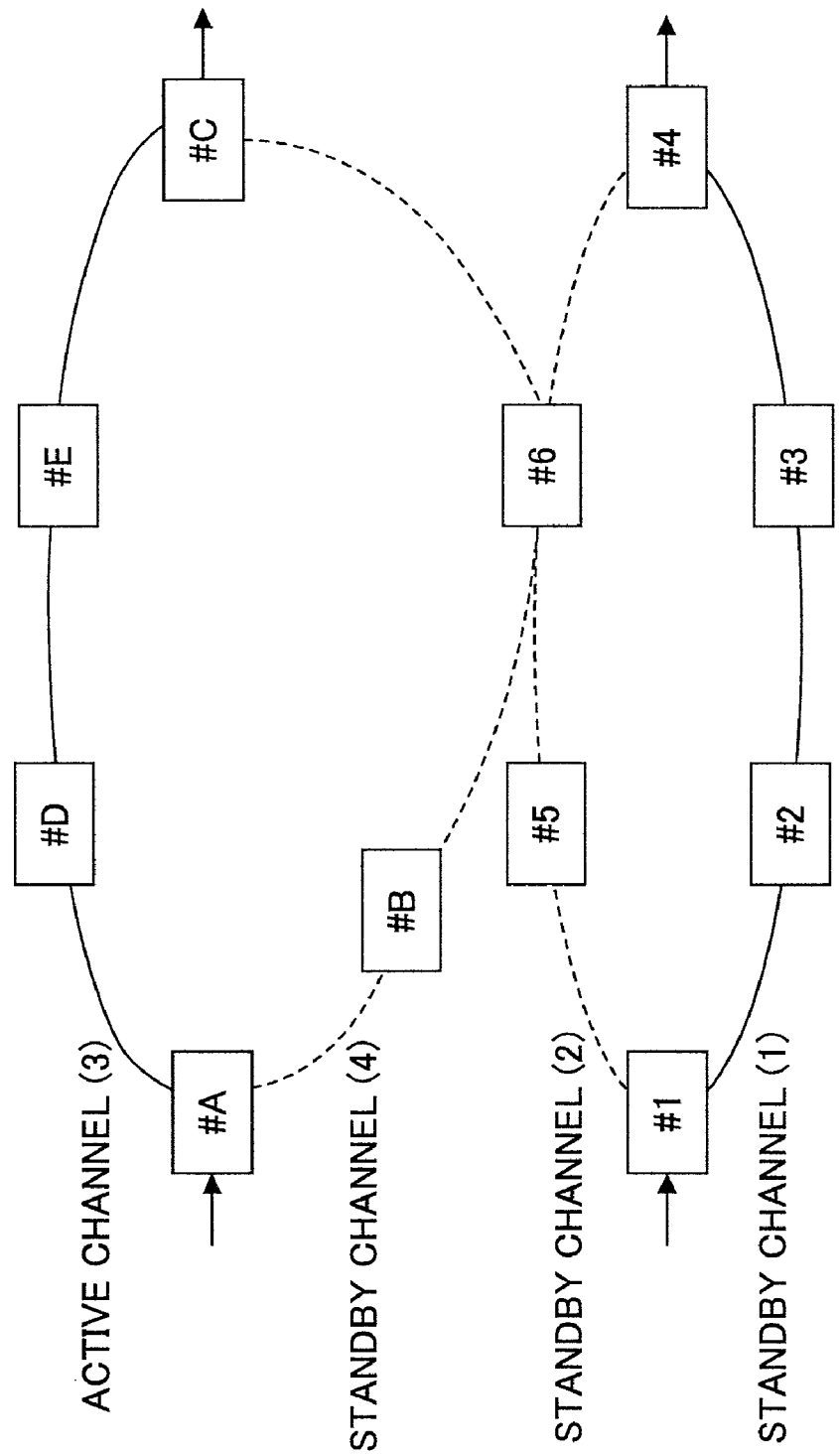

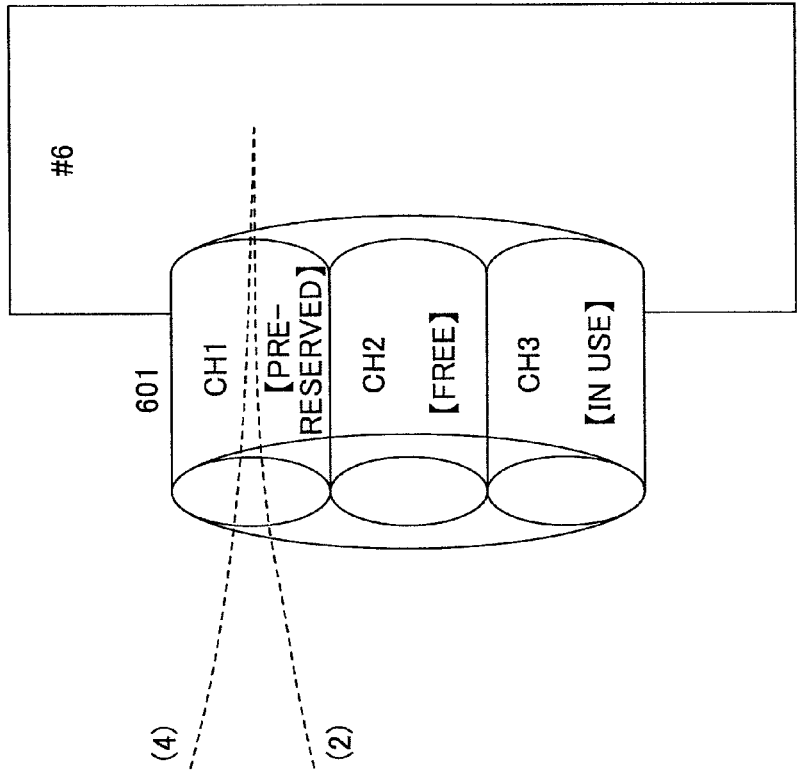

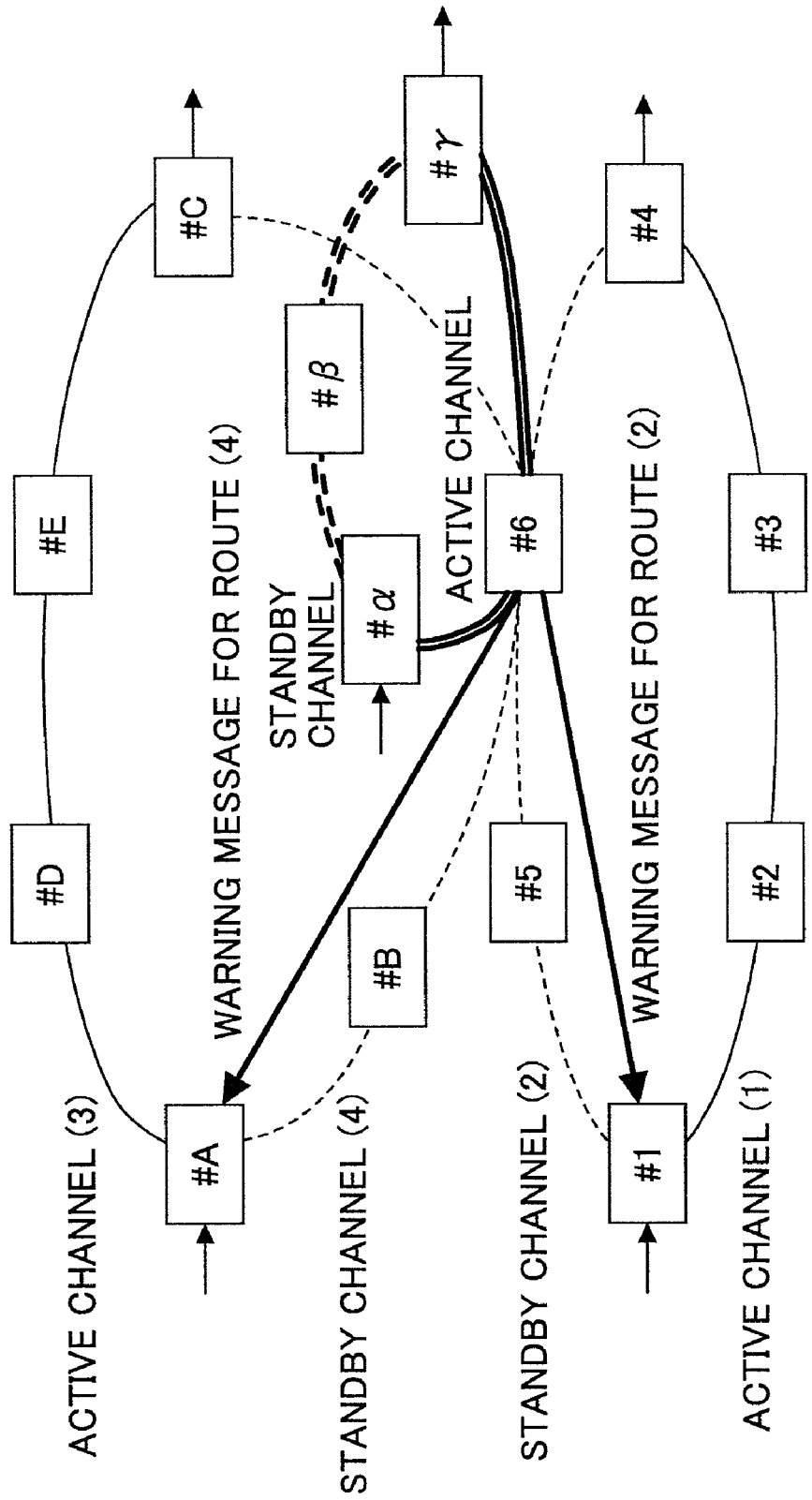

FIG.15B

BAND MANAGEMENT TABLE

| 601 |||
|---|---|---|
| CONNECTION ID (5) | CONNECTION ID (2) | CONNECTION ID (4) |
| Ingress Node #α | Ingress Node #1 | Ingress Node #A |
| .... | .... | .... |
| BAND INFORMATION CH1: RESERVED CH2: FREE CH3: IN USE | BAND INFORMATION CH1: RESERVED CH2: FREE CH3: IN USE | BAND INFORMATION CH1: RESERVED CH2: FREE CH3: IN USE |

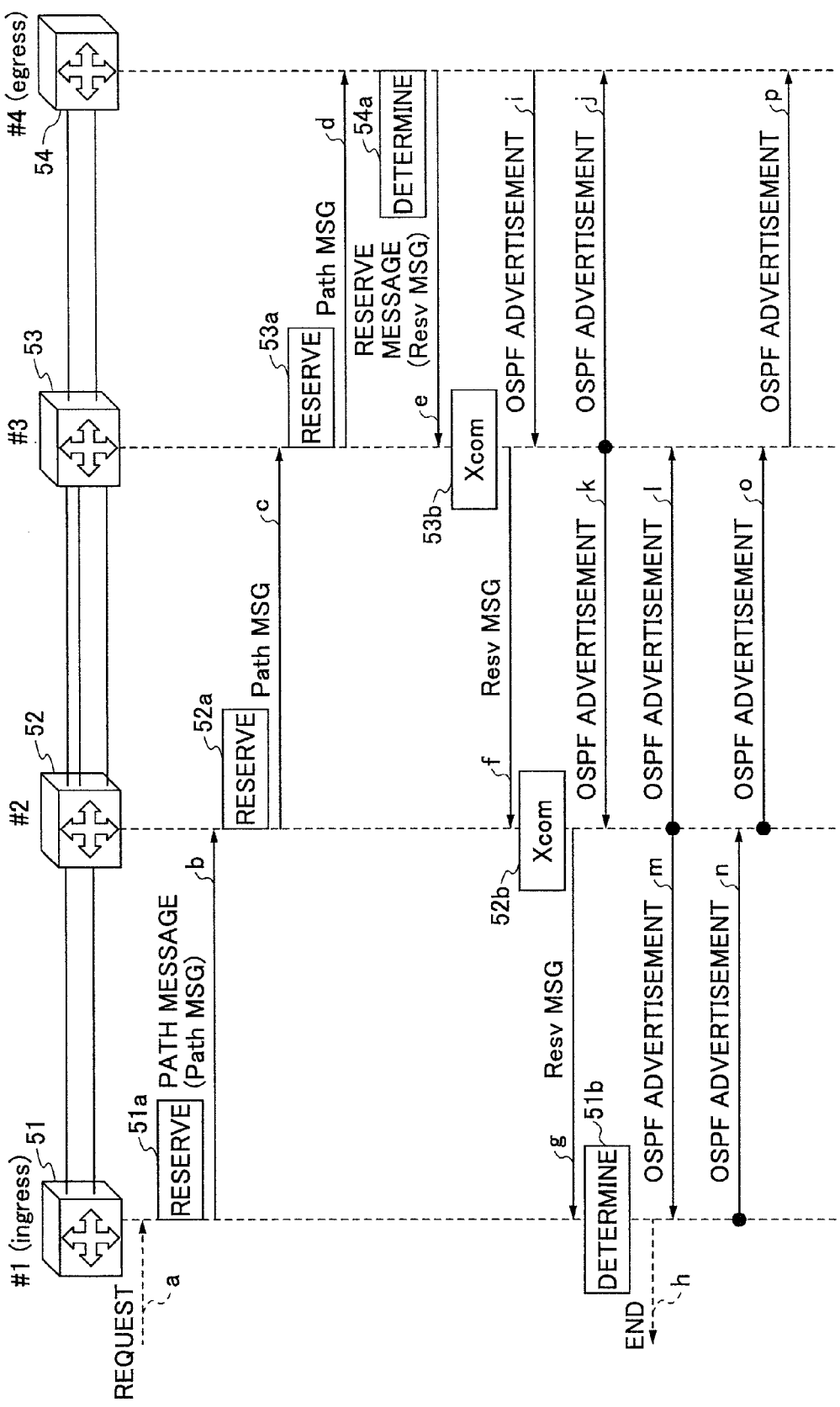

CONTROL SCHEME FOR STANDBY CHANNEL ROUTE

BACKGROUND OF THE INVENTION

1. Field of the Invention

The present invention relates to a control scheme for controlling a standby channel route for an active channel route established between an ingress node and an egress node of a GMPLS (Generalized Multi-Protocol Label Switching) network.

2. Description of the Related Art

In recent years and continuing, MPLS (Multi-Protocol Label Switching) as a technique that introduces the concept of label switching to the IP network to enable network operations using paths is being widely implemented. However, the MPSL technique is not limited to application to the IP network, and GMPLS (Generalized Multi-Protocol Label Switching) as a technique for enabling automatic dispersion in a TDM (Time Division Multiplexing) network such as the SDH (Synchronous Digital Hierarchy)/SONET (Synchronous Optical NETwork) or a path network including a wavelength switching network is being contemplated for standardization and application by organizations such as the CCAMP (Common Control and Measurement Plane)-WG (Working Group) OIF (Optical Internetworking Forum) of the IETF (Internet Engineering Task Force) and the ITU (International Telecommunication Union).

By implementing the GMPLS technique, path connection between different systems may be standardized, and efficient network operations may be enabled by BoD (Bandwidth on Demand) services for high speed path connection and unilateral management of multiple layers. In GMPLS, an MPLS header is attached to an IP packet, and the IP packet is transmitted within the network based on a label contained in the MPLS header. Such packet transmission mechanism is referred to as label switching. It is noted that various items such as a timeslot, a wavelength group, or fiber, for example, may be used as a label.

In the GMPLS, signaling, routing, and link management protocols are established, and a concept referred to as switching capability is used to define the capabilities of the protocols for path control in the IP network, L2 switching network, TDM network, wavelength switching network, and fiber switching network, for example. An extension of RSVP-TE (Resource ReSerVation Protocol-Traffic Engineering) describing procedures for establishing a path along a route may be defined as the signaling protocol. As for the routing protocol, procedures are described for flooding link states within the network (i.e., using a flooding mechanism to detect/determine the state of the network by releasing information held by transmission apparatuses included in the network throughout the network and compiling the information into a shared database, the act of the routing protocol flooding its transmission apparatus database being referred to as "advertisement") and enabling each transmission apparatus to determine its link state within the network through automatic dispersion. The routing protocol may be an extension of OSPF-TF (Open Shortest Path First-Traffic Engineering) configured to enable flooding of link information of various types of path networks.

FIGS. 16 and 17 are diagrams illustrating examples of constructing a ring network and establishing paths with plural apparatuses having GMPLS functions. Specifically, FIG. 16 shows a configuration of a GMPLS network, and FIG. 17 illustrates a basic path establishing sequence.

The illustrated GMPLS network of FIG. 16 includes an input transmission path 50, transmission apparatuses 51-56 (#1-#6) with GMPLS functions, and an output transmission path 57. The transmission apparatuses #1-#6 are sequentially connected by transmission channels, and a path is automatically established to enable signaling using their GMPLS functions.

In the following, a basic path establishing sequence is described with reference to FIG. 17. It is noted that transmission apparatuses 51 (#1) through 54 (#4) shown in FIG. 17 correspond to the transmission apparatuses 51 (#1) through 54 (#4) shown in FIG. 16. In this drawing, an example is illustrated where paths are established between the transmission apparatuses 51 (#1) through 54 (#4) with the transmission apparatus #1 as the ingress node and the transmission apparatus #4 as the egress node. It is noted that a topology map of the network and band information of the transmission apparatuses are arranged into a database by the OSPF functions of the GMPLS and are shared by all the transmission apparatuses included in the network. Also, when at least one of the transmission apparatuses updates its internal database, it advertises its updated database to the rest of the transmission apparatuses so that the database shared by all the transmission apparatuses within the network may be synchronized.

According to the example of FIG. 17, paths may be established by the following procedures:

1. First, a path establishing command (signaling request) is input to transmission apparatus #1 corresponding to the ingress node (see arrow a of FIG. 17).

2. At transmission apparatus #1, route calculation is performed for calculating the shortest route from transmission apparatus #1 to transmission apparatus #4 based on the shared database. In the present example, the shortest route is determined to be route (1) shown in FIG. 16 (i.e., route passing the transmission apparatuses #1-#4 in this order).

3. At the transmission apparatus #1, the status of the band of a port forming route (1) is switched from "free" to "reserved" (see 51a of FIG. 17), and a path message (Path MSG) is transmitted to the rest of the transmission apparatuses #2-#4 forming route (1) (see arrows b-d of FIG. 17).

4. The transmission apparatuses #2 and #3 receiving the path message switch the statuses of the bands of designated ports from "free" to "reserved" (see 52a and 53a of FIG. 17) and transmit the path message to the next transmission apparatus.

5. The transmission apparatus #4 corresponding to the egress node switches the statuses of the bands of designated ports from "reserved" to "determined (in use)" (see 54a of FIG. 17), executes transmission apparatus path establishing processes (cross connection including switching), updates its own database, and transmits a reserve message (Resv MSG) to the transmission apparatus #3 (see arrow e of FIG. 17). When the statuses of the bands are switched from "reserved" to "determined (in use)", the transmission apparatus #4 assumes that its internal data (database) have been updated and transmits an OSPF advertisement message to the rest of the transmission apparatuses for advertising the change in its internal database (see arrow i of FIG. 17).

6. The transmission apparatuses #3 and #2 transmit the reserve message in reverse order of the transmission order of the path message (see arrows f and g of FIG. 17). The transmission apparatuses #1-#3 receiving the reserve message switch the statuses of their corresponding bands from "reserved" to "determined", execute cross connection (Xcon) processes (see 53b, 52b, and 51b of FIG. 17), update their own databases, and transmit OSPF advertisement messages for advertising the change in their internal databases to the rest of the transmission apparatuses (see arrows j-m of FIG. 17).

7. Overall cross connection of route (1) may be completed when the transmission apparatus #1 corresponding to the ingress node receives the reserve message and performs its corresponding cross connection processes (see arrow h of FIG. 17).

8. After advertisement operations by the transmission apparatuses are completed, all the transmission apparatuses within the network may recognize that the statuses of the bands used in route (1) are set to "determined (in use)". Since route calculation involves searching "free" bands, the bands used in route (1) may no longer be considered for use in the route calculations performed by any of the transmission apparatuses after completion of such advertisement operations.

After forming route (1) shown in FIG. 16 as the active channel route, path establishing processes for forming a standby channel path are performed in order to enable immediate transmission of information via the standby channel route (substitute route) in a case where failure occurs in the active channel route. In the present example, paths along route (2) shown in FIG. 16 connecting the transmission apparatuses #1, #5, #6, and #4 in this order are established.

In Japanese Laid-Open Patent Publication No. 10-303932, a communication apparatus and a communication method are disclosed for performing resource allocation for communication requests transmitted from an unspecified number of sources according to their transmission information contents and dynamically changing resource allocation according to the information contents. According to the disclosed technique, an index indicating information contents attached to a message is used, and communication bands are assigned according to the index information. In this case, the communication band secured for transmitting information is managed by dividing the communication band into a fixed band and a dynamic band. The index is used to objectively determine priority of the communication requests according to the communication information contents and media characteristics when securing the fixed band and adjusting the dynamic band at the point of starting communication. Also, objective priority determination using the index is performed when executing communication reservation functions through scheduling in consideration of instances in which the fixed band or the dynamic band cannot be immediately secured. The data transmission procedures of servers and routers according to this technique, after performing data selection (e.g., index, size, transmission time, bandwidth) and issuing a user request (e.g., desired transmission start time/date), a router or a server determines priority of the fixed band for the requested data, and a terminal, a server, or a router arranged between a server and a terminal pre-reserves a communication channel from the transmission start time to the transmission end time. The pre-reservation involves accepting one or more communication requests over a predetermined bidding time period, determining priority of the communication requests if plural communication requests are received, pre-reserving bands for the communication requests according to the determined priority, registering the pre-reservations of the communication resources as actual reservations after the bidding time period is over, and notifying the user of the service start/end time.

According to the path establishing sequence performed in a conventional GMPLS network as is illustrated in FIG. 17, paths along route (1) connecting the transmission apparatuses #1-#4 in this order are established as the active channel route, and paths along route (2) connecting the transmission apparatuses #1, #5, #6, and #4 in this order are established as the standby channel route. In this case, bands of the paths forming route (2) may be exclusively reserved despite that fact that the paths of route (2) may not actually be used. In this respect, a method is proposed for establishing only route (1) and not establishing route (2) to realize efficient use of band resources. In this case, when failure occurs between the transmission apparatuses #3 and #4, for example, the transmission apparatus #3 transmits a warning message to the transmission apparatus #1 corresponding to the ingress transmission apparatus of route (1). Upon receiving the warning message, the transmission apparatus #1 executes signaling by performing route calculation once again to obtain a detour route so that traffic may be transmitted via route (2). However, in this case, the standby channel route may not always be secured; that is, another path may already be established using the band resources of the paths for forming route (2) in which case the desired transmission operations cannot be performed. Also, time may be required for performing the detour route recalculation processes and the signaling processes.

The technique disclosed in Japanese Laid-Open Patent Publication No. 10-303932 involves pre-reserving bands for a predetermined time period (bidding time period) and then actually reserving the bands after the predetermined time period elapses. This technique is similar to the above-described technique for reserving the bands to be used by an active channel route of a GMPLS network and securing the bands upon determining the active channel route as opposed to a technique for reducing unnecessary reservation of bands to be used by a standby channel route.

SUMMARY OF THE INVENTION

According to an aspect of the present invention, a control scheme is provided for controlling a standby channel route for an active channel route established between an ingress node and an egress node of a GMPLS network which control scheme enables efficient formation of the standby channel route without exclusively securing bands to be used by the standby channel route when the active channel route is determined.

According to one embodiment of the present invention, a control scheme is provided for controlling establishment of a standby channel route for an active channel route in a Generalized Multi-Protocol Label Switching network made up of a plurality of transmission apparatuses including an ingress transmission apparatus, an egress transmission apparatus, at least one active channel route transmission apparatus, and at least one standby channel route transmission apparatus, wherein the standby channel route is formed by the standby channel route transmission apparatus, the ingress transmission apparatus, and the egress transmission apparatus, the control scheme involving:

transmitting from the ingress transmission apparatus to the standby channel route transmission apparatus a standby channel path establishing message including pre-reserve information for directing the standby channel route transmission apparatus to pre-reserve a standby channel path of the standby channel route; and setting the standby channel path to pre-reserved status within a band management table of the standby channel route transmission apparatus when the standby channel transmission apparatus receives the standby channel path establishing message; wherein the standby channel path that is set to pre-reserved status within the band management table of the standby channel route transmission apparatus is externally recognized as free by the transmission apparatuses other than the standby channel route transmission apparatus.

According to another embodiment of the present invention, a control scheme is provided for controlling establishment of a standby channel route for an active route in a Generalized Multi-Protocol Label Switching network made up of a plurality of transmission apparatuses including an ingress transmission apparatus, an egress transmission apparatus, at least one active channel route transmission apparatus, and at least one standby channel route transmission apparatus, wherein the standby channel route is formed by the ingress transmission apparatus, the egress transmission apparatus, and the standby channel route transmission apparatus, the control scheme involving:

selecting beforehand whether to pre-reserve a standby channel path of the standby channel route, and whether to use a bit array arranged at a head of a secondary explicit route object of a standby channel path establishing message transmitted from the ingress transmission apparatus to the standby channel route transmission apparatus or reserved bits included in a label subobject of the standby channel path establishing message to identify pre-reserve information for directing the standby channel route transmission apparatus to pre-reserve the standby channel path; and setting the standby channel path to pre-reserved status within a band management table of the standby channel route transmission apparatus when the standby channel route transmission apparatus receives the standby channel path establishing message; wherein the standby channel path that is set to pre-reserved status within the band management table of the standby channel route transmission apparatus is externally recognized as free by the transmission apparatuses other than the standby channel route transmission apparatus.

BRIEF DESCRIPTION OF THE DRAWINGS

FIG. 2 is a diagram illustrating a configuration of a band management table;

FIGS. 10A-10D are diagrams illustrating exemplary band information update advertising operations;

FIGS. 13A-13D are diagrams illustrating exemplary active channel switching operations;

FIGS. 14A-14C are diagrams illustrating exemplary operations performed when plural paths are established at one port;

FIGS. 15A-15C are diagrams illustrating another set of exemplary operations performed when plural paths are established at one port;

FIG. 17 is a sequence chart illustrating a basic path establishing operations sequence.

DESCRIPTION OF THE PREFERRED EMBODIMENTS

In the following, preferred embodiments of the present invention are described with reference to the accompanying drawings.

Figure 1:
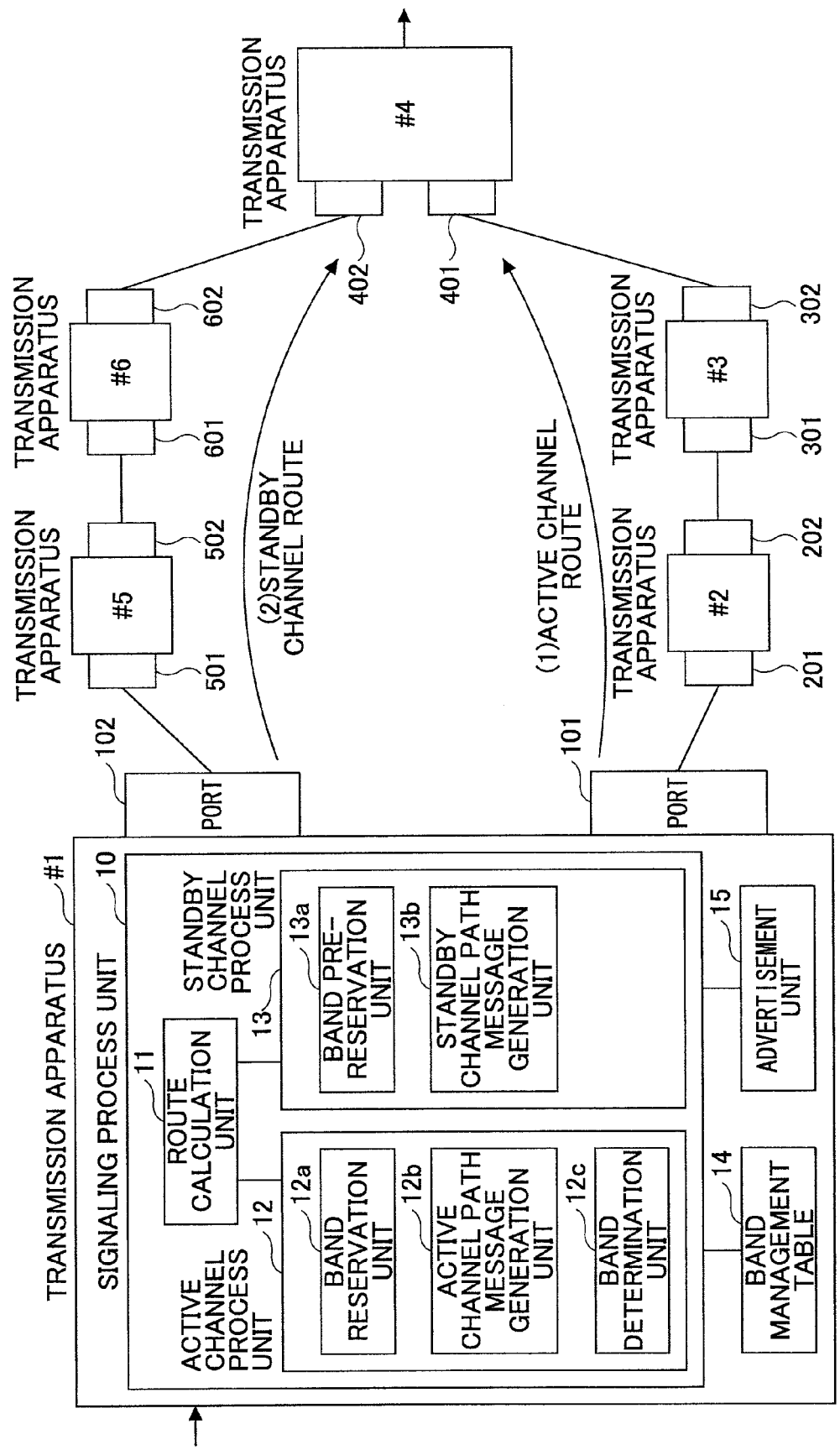
FIG. 1 is a diagram illustrating a GMPLS network in which an embodiment of the present invention may be implemented.

FIG. 1 is a diagram illustrating a configuration of a GMPLS network in which an embodiment of the present invention may be implemented.

The GMPLS network of FIG. 1 includes plural transmission apparatuses #1-#6. In the illustrated example, the transmission apparatus #1 corresponds to an ingress transmission apparatus (ingress node), and the transmission apparatus #4 corresponds to an egress transmission apparatus (egress node). The transmission apparatus #1 includes a signaling process unit 10, a route calculation unit 11, an active channel process unit 12, a standby channel process unit 13, a band management table 14, an advertisement unit 15, a port 101 selected for the active channel, and a port 102 selected for the standby channel. The active channel process unit 12 includes a band reservation unit 12a, an active channel path message generation unit 12b, and a band determination unit that sets the status of a band to determined (or in use) status. The standby channel process unit 13 includes a band pre-reservation unit 13a and a standby channel path message generation unit 13b. Also, in the present example, route (1) that passes the transmission apparatuses #1 through #4 in this order corresponds to the active channel route, and route (2) that passes the transmission apparatuses #1, #5, #6, and #4 in this order corresponds to the standby channel route. The transmission apparatus #2 of the active channel route includes an input port 201 and an output port 202. Transmission apparatus #3 of the active channel route includes an input port 301 and an output port 302. Transmission apparatus #4 corresponding to the egress transmission apparatus includes an input port 401 of the active channel route and an input route 402 of the standby channel route. The transmission apparatus #5 of the standby channel route includes an input port 501 and an output port 502. The transmission apparatus #6 of the standby channel route includes an input port 601 and an output port 602. Although it is not shown in the present drawing, the transmission apparatuses #2-#6 may have internal configurations similar to that of the transmission apparatus #1.

When a request for establishing an active channel route and a standby channel route between the ingress transmission apparatus #1 and the egress transmission apparatus #4 is input, the route calculation unit 11 of the signaling process unit 10 of the transmission apparatus #1 refers to the band management table 14 to calculate the shortest route as the active channel route (1) and output the calculation result to the active channel process unit 12. Then, the route calculation unit 11 calculates the standby channel route (2) and outputs the calculation result to the standby channel process unit 13. In one embodiment, Dijkstra's algorithm may be used to perform route calculation in the route calculation unit 11.

In the active channel process unit 12, the band reservation unit 12a performs band reservation by switching band status information within the band management table 14 from "free" to "reserved" for the band of the port 101 of the ingress transmission apparatus #1 of the active channel route. The active channel path message generation unit 12b generates an active channel path message (active channel path establishing message) and transmits the generated message to the next transmission apparatus #2 of the active channel route. The active channel path message includes band information of the bands used by each of the transmission apparatuses on the route calculated by the route calculation unit 11. The transmission apparatus #2 performs band reservation operations for reserving the bands to be used by the input port 201 (connected to the transmission apparatus #1) and the output port 202 of the active channel route, and issues the active channel path message to be transmitted to the next transmission apparatus #3 of the active channel route. The transmission apparatus #3 also performs similar band reservation operations for securing bands to be used by the active channel route, and transmits the active channel path message to the transmission apparatus #4.

After band reservation operations for reserving the bands to be used by the active channel route are performed in the manner described above, the egress transmission apparatus #4 switches the band status information of the band used by its port 401 from "reserved" to "determined (in use)", and generates a reserve message to be successively transmitted to the transmission apparatuses #3-#1 so that the statuses of the bands of the active channel route ports of the transmission apparatuses #3-#1 may also be switched from "reserved" to "determined (in use)". By switching the statuses of the bands used by the active channel paths of the active channel route from "reserved" to "determined (in use)", cross connects (path switching) may be established and the corresponding bands may be prevented from being used by other users. After the bands of the transmission apparatuses #4-#1 of the active channel route are successively switched from "reserved" to "determined (in use)" in this order and cross connects for label switching are established, the change in the band status information within the band management table of a corresponding transmission apparatus is signaled to its neighboring transmission apparatuses by its advertisement unit. Each of the transmission apparatuses receiving such information updates its own band management table data based on the received information so that the same information may be stored in all the transmission apparatuses.

In the standby channel process unit 13 of the ingress transmission apparatus #1, when the route calculation unit 11 obtains route (2) including the transmission apparatuses #1, #5, #6, and #4 as the shortest standby channel route from the transmission apparatus #1 to the transmission apparatus #4, the pre-reservation unit 13a switches the band status information of the band used by the path of the port 102 connected to the transmission apparatus #5 of the standby channel route to "pre-reserved" in the band management table 14. In turn, the standby channel path message generation unit 13b generates a standby channel path message (standby channel path establishing message) and transmits from port 102 the generated path message to the input port 501 of the next transmission apparatus #5 of the standby channel route. The standby channel path message includes path information such as information on the ports of the transmission apparatuses forming the standby channel route calculated by the route calculation unit 11. The standby channel path message is transmitted via the input ports and output ports of the transmission apparatuses #5, #6, and #4 of the standby channel route. Upon receiving and identifying the transmitted standby channel path message, the transmission apparatuses #5, #6, and #4 switch the band status information of their corresponding ports from "free" to "pre-reserved" within their band management tables. After the egress transmission apparatus #4 receives the standby channel path message and switches the relevant band information within its band management table, the egress transmission apparatus #4 issues a standby channel route reserve message (Resv MSG) to be transmitted in reverse order of the transmission order of the standby channel path message (i.e., transmission apparatuses #6, #5, #1). Upon receiving the reserve message issued by the egress transmission apparatus #4, the transmission apparatuses #6, #5, and #1 maintain the statuses of their band information of the standby channel route to "pre-reserved" and do not advertise their internal data to their neighboring transmission apparatuses. It is noted that a band set to "pre-reserved" within the band management table of a given transmission apparatus is construed as "free" by the route calculation unit of the transmission apparatus.

When failure occurs within the active channel route, a warning message is transmitted from the transmission apparatus detecting the failure to the ingress transmission apparatus #1. Upon receiving the warning message, the transmission apparatus #1 transmits a path cancellation message to the transmission apparatuses #2-#4 of the active channel route to cancel the active channel paths. Specifically, band information of the bands used by the active channel route is changed from "determined" to "free" within the band management tables of the transmission apparatuses, and the changed information of each of the transmission apparatuses is advertised to the other transmission apparatuses. Also, the transmission apparatus #1 transmits a switching path message to the transmission apparatuses #6, #5, and #4 of the standby channel route to switch the band status information of the bands previously set to "pre-reserved" to "determined (in use)" and establish cross connects for path switching. Then, the change in the band information within the transmission apparatuses is advertised so that the standby channel route may be used as a new active channel route. Further, standby channel route calculation for calculating a new standby channel route for the new active channel route is performed at the transmission apparatus #1. Specifically, a standby channel path message is transmitted to the transmission apparatuses that are to be used by the calculated standby channel route, and the band status information of the paths forming the calculated standby channel route is set to "pre-reserved".

When a request to use the band of a standby channel path set to "pre-reserved" as an active channel path is issued, the request may be given priority. For example, when a request to use the bands set to "pre-reserved" within the transmission apparatuses #5 and/or #6 of the standby channel route is issued, a warning message may be transmitted from the transmission apparatus #5 and/or #6 to the ingress transmission apparatus #1. Upon receiving such a warning message, the transmission apparatus #1 transmits a path cancellation message to the transmission apparatuses forming the current standby channel route (pre-reserved route) to cancel the "pre-reserved" status of the relevant bands while the active channel route is still operating normally, performs route calculation for calculating a new standby channel route, transmits a corresponding standby channel path message to the relevant transmission apparatuses forming the new standby channel route, and sets the relevant bands to "pre-reserved" status so that a standby channel route may be secured on a continual basis.

In a case where a new standby channel route cannot be secured by the standby channel route calculation, a warning message may be issued so that inspection and maintenance may be performed while the active channel route is operating in order to prevent cases in which communication becomes impossible when the active channel route fails, for example.

According to an embodiment of the present invention, in a GMPLS network, when an active channel route is determined, a standby channel route is secured through pre-reservation so that bands may not be unnecessarily monopolized. In a case where failure occurs within the active channel route, the pre-reserved standby channel route may be readily switched for use as the active channel route.

FIG. 2 is a diagram showing an exemplary configuration of the band management table 14 shown in FIG. 1. Specifically, FIG. 2 illustrates sets of information 14-1 through 14-n for plural ports (interface index: if index) that are provided in a given transmission apparatus. It is noted that the ports of the transmission apparatus are identified by port numbers 1 through n and the information sets 14-1 through 14-n are respectively assigned to the ports #1 through #n. The ports may each include plural connections (paths). For example, port #1 has m connections, and port information 14-1 pertaining to port #1 includes information items such as a connection ID 140, an ingress node IP (address) 141 indicating the ingress transmission apparatus, an egress IP (address) 142 indicating the egress transmission apparatus, relevant information 143 pertaining to the connection, and band information 144 for each of the connections. It is noted that the band information 144 may represent one of four different band statuses, namely, a "free" status, a "reserved" status, a "determined/in use" status, or a "pre-reserved" status. It is noted that each set of information for each connection may have a similar configuration as is described above.

Figure 3A:
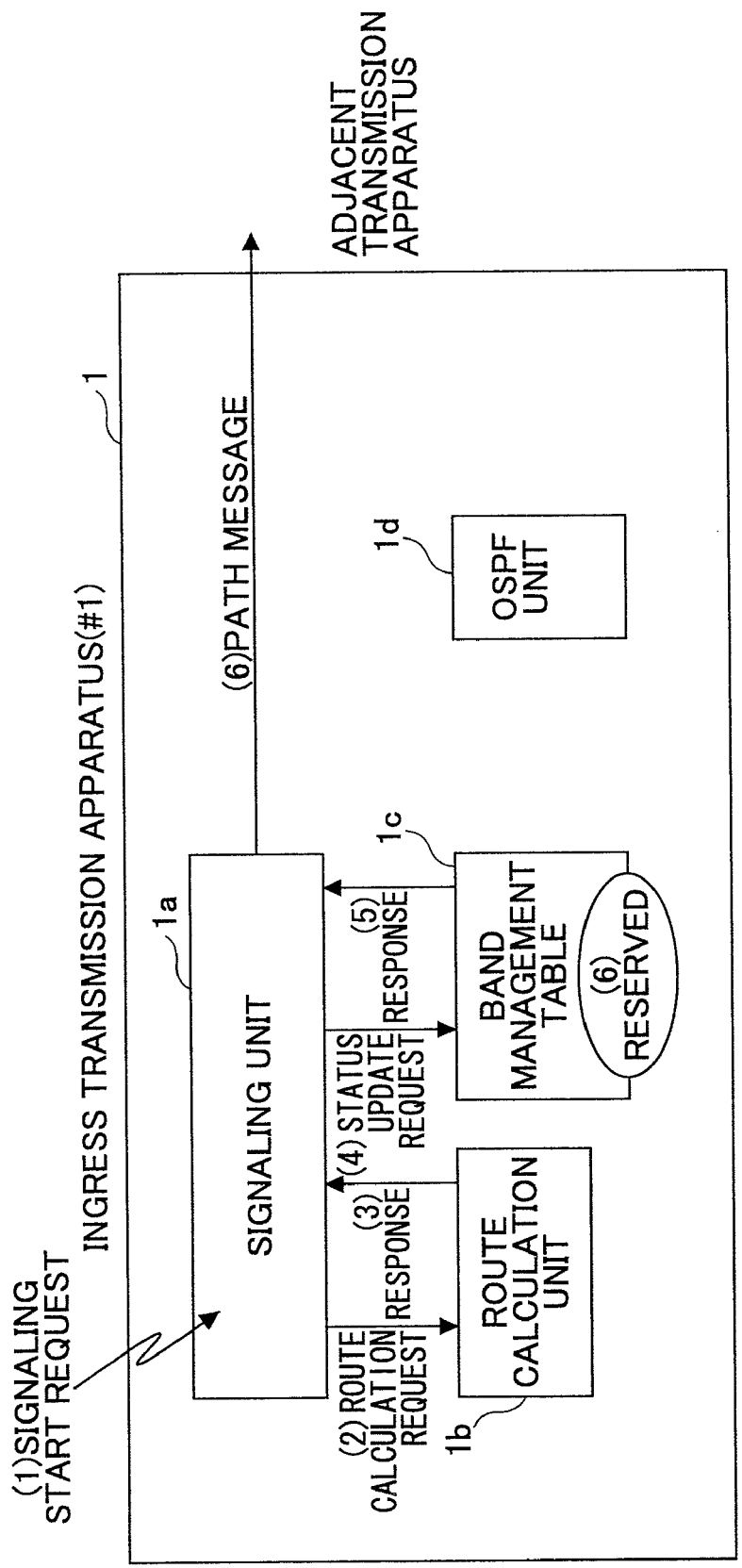
FIGS. 3A and 3B are diagrams illustrating exemplary operations for establishing an active channel route.
Figure 3B:
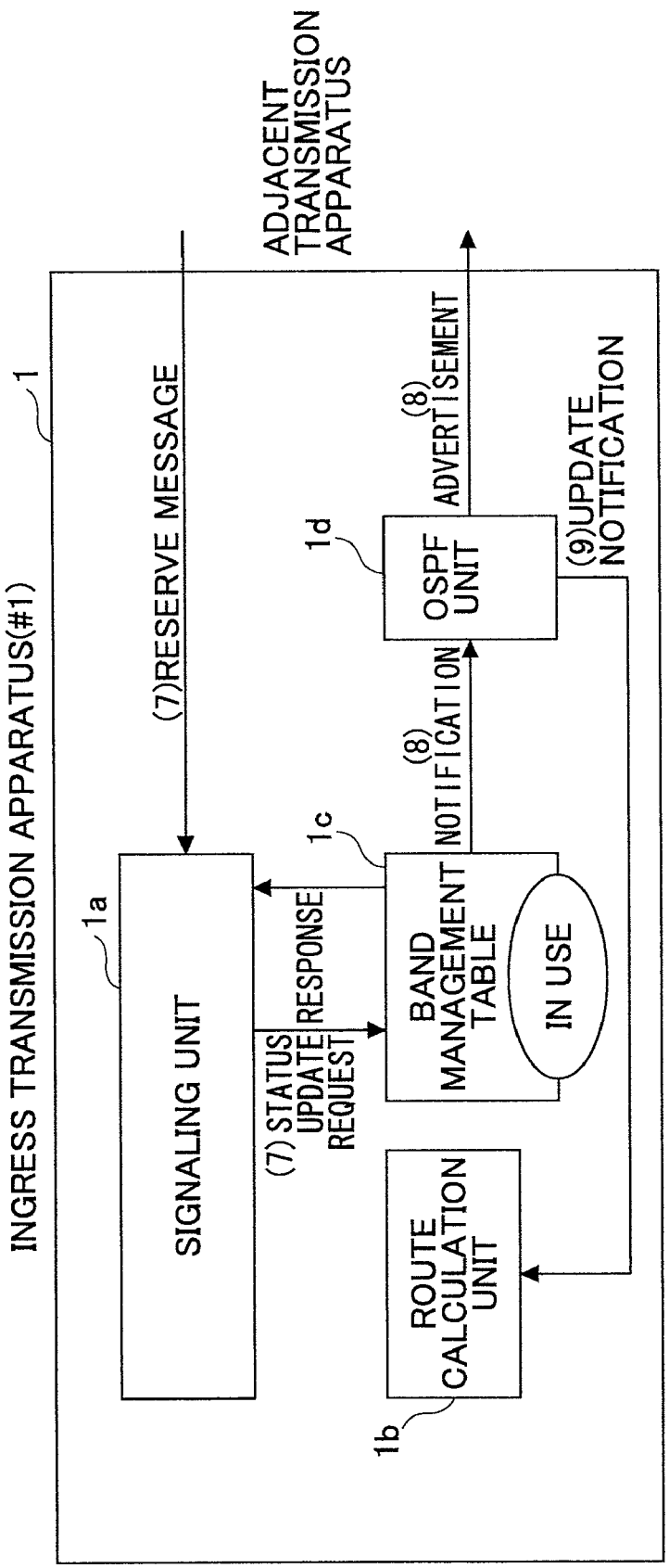
Figure 4A:
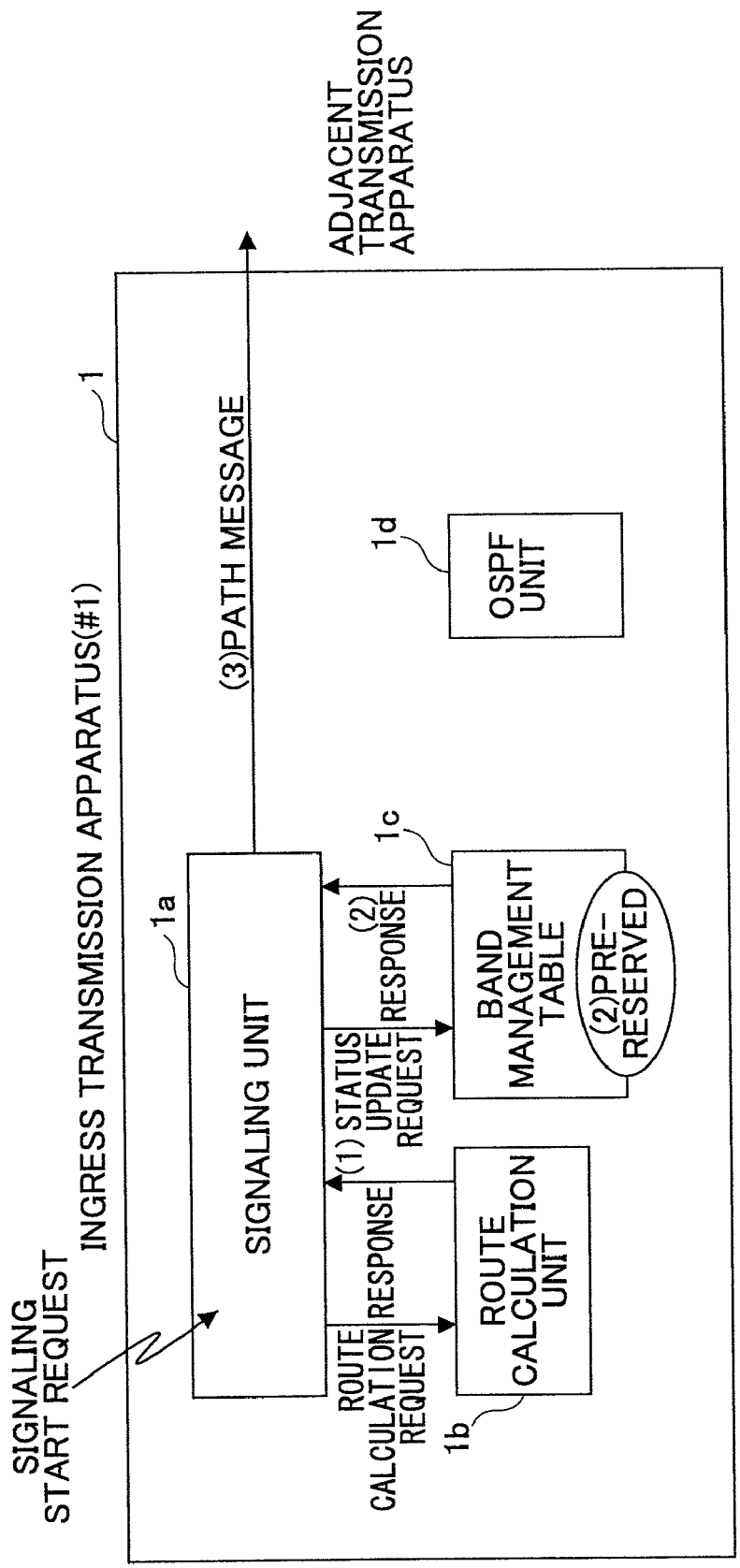
FIGS. 4A and 4B are diagrams illustrating exemplary operations for establishing a standby channel route.
Figure 4B:
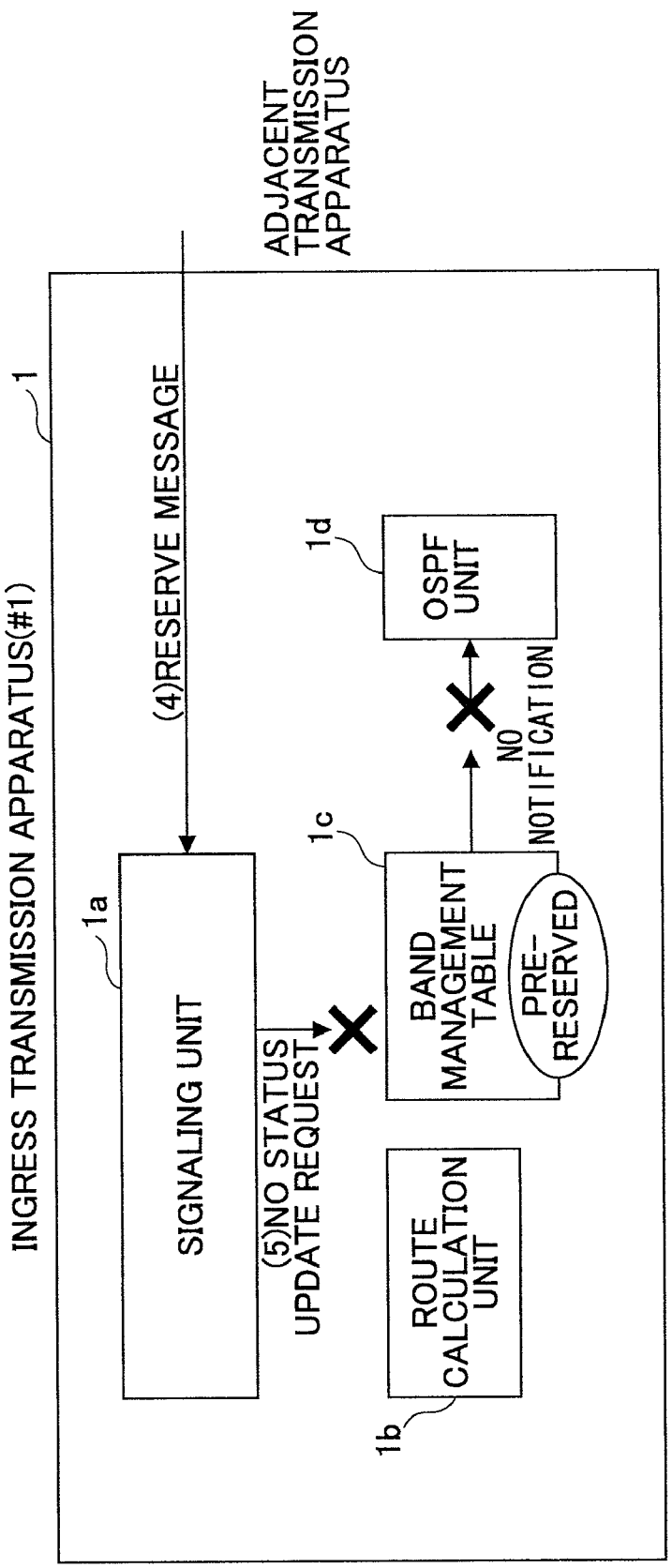

FIGS. 3A and 3B are diagrams illustrating exemplary active channel route establishing operations performed by a transmission apparatus. FIGS. 4A and 4B are diagrams illustrating exemplary standby channel route establishing operations performed by a transmission apparatus. Specifically, FIGS. 3A, 3B, 4A, and 4B illustrate operations of the ingress transmission apparatus of a network (corresponding to transmission apparatus #1 of FIG. 1). FIGS. 3A and 3B mainly illustrate active channel route signaling operations, where FIG. 3A illustrates transmission of a path message and FIG. 3B illustrates reception of a reserve message. FIGS. 4A and 4B illustrate standby channel route signaling operations, where FIG. 4A illustrates transmission of a path message and FIG. 4B illustrates reception of a reserve message.

The illustrated ingress transmission apparatus (#1) 1 (corresponding to the transmission apparatus #1 of FIG. 1) includes a signaling unit 1a (corresponding to the signaling process unit 10 including the active channel process unit 12 and the standby channel process unit 13 of FIG. 1), a route calculation unit 1b (corresponding to the route calculation unit 11 of FIG. 1), a band management table (also referred to as LSDB: Label Switching Database) 1c as a database storing status information of paths (ports) provided within the transmission apparatus 1 (corresponding to the band management table 14 of FIG. 1), and an OSPF (Open Shortest Path First) unit 1d that executes OSPF functions corresponding to a shortest path routing protocol and executes band management table advertisement (corresponding to the advertisement unit 15 of FIG. 1).

In the following, operations (1) through (6) shown in FIG. 3A and operations (7) through (9) shown in FIG. 3B are described as the active channel route establishing operations.

(1) Signaling operations are started when a GMPLS signaling start request is transmitted to the ingress transmission apparatus #1.

(2) Upon receiving the signaling start request, the signaling unit 1a transmits a route calculation request to the route calculation unit 1b.

(3) The route calculation unit 1b calculates the shortest route based on network information received from the OSPF unit 1d up until the current time, and transmits a response including the calculation result to the signaling unit 1a.

(4) Upon receiving the response from the route calculation unit 1b, the signaling unit 1a transmits a status update request to the band management table 1c for switching the status of the band of the path (connection) to be used by the transmission apparatus #1 to "reserved".

(5) The band management table 1c switches the band information of the path (connection) of the port to be used to "reserved" and transmits a response to the signaling unit 1a.

(6) The signaling unit 1a incorporates route information and reserved band information in a path message, transmits that path message to an adjacent transmission apparatus (e.g., transmission apparatus #2 of FIG. 1).

(7) After transmitting the path message, when a reserve message generated at an egress transmission apparatus of the network (e.g., transmission apparatus #4 of FIG. 1) and transmitted toward the present ingress transmission apparatus #1 in reverse order with respect to the transmission order of the path message is received, the signaling unit 1a transmits a status update request to the band management table 1c for switching the relevant band information to "in use".

(8) After switching the relevant band information to "in use" status, the band management table 1c notifies the OSPF unit 1d of the change in information, and in turn, the OSPF unit 1d advertises the updated contents of the bang management table 1c to the adjacent transmission apparatus (e.g., transmission apparatus #2 of FIG. 1).

(9) Also, the OSPF unit 1d notifies the route calculation unit 1b of the information update of the band management table 1c to update the network topology.

Figure 5:
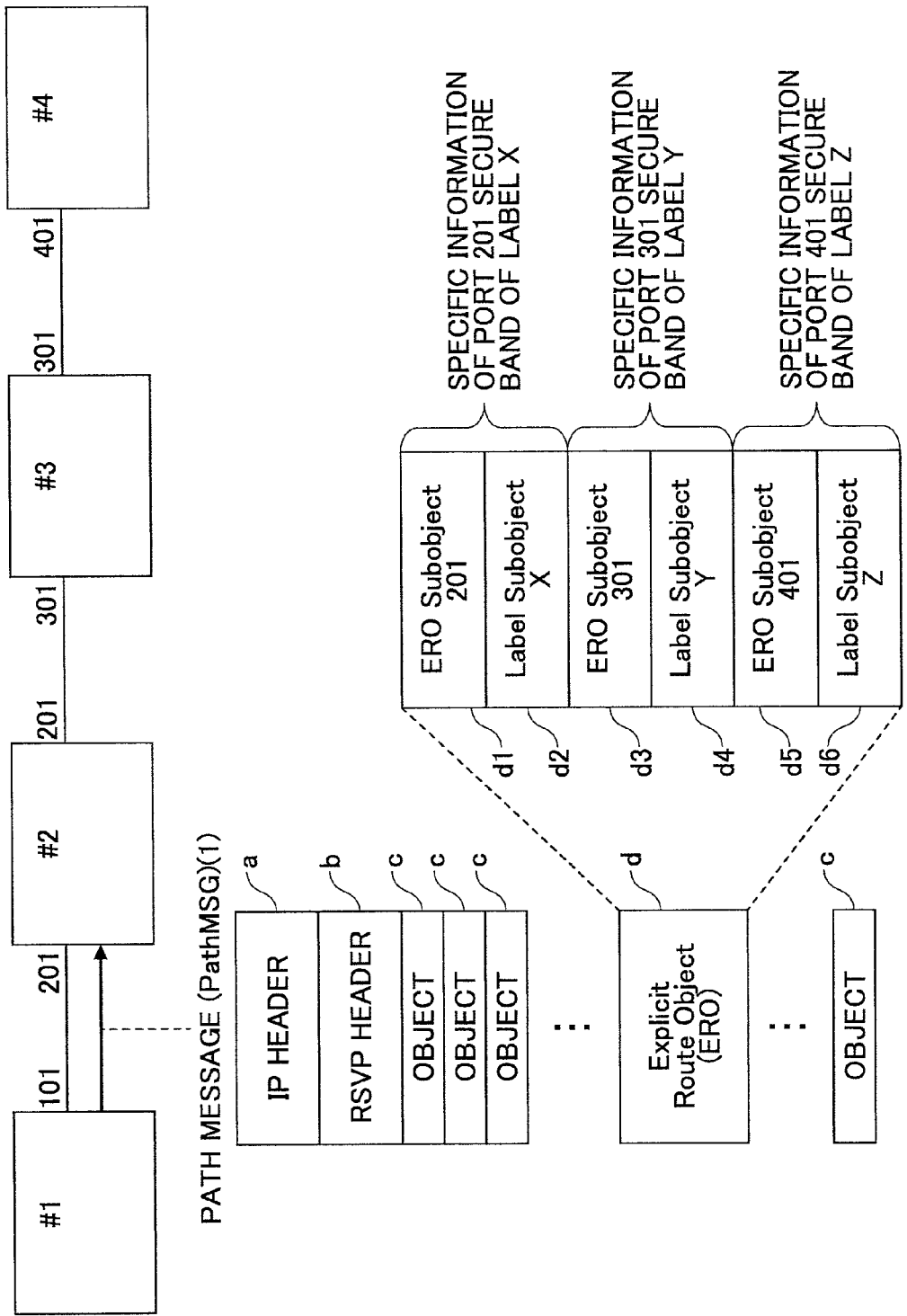
FIG. 5 is a diagram illustrating an exemplary configuration of an active channel path message that is transmitted from an ingress transmission apparatus to the active channel route.

FIG. 5 is a diagram illustrating an exemplary configuration of a path message (Path MSG) that is transmitted from the ingress transmission apparatus #1 to the active channel route. In the illustrated example, the path message is generated in order to form paths (connections) along the active channel route (1) shown in FIG. 1 (i.e. including transmission apparatuses #1, #2, #3, and #4) and is transmitted to an adjacent apparatus #2.

As is shown in FIG. 5, an IP (Internet Protocol) header (a) is arranged at the head of the path message followed by a RSVP (Resource Reservation Protocol) header (b). Then, plural types of objects (c) including a route object (ERO: Explicit Route Object) (d) are arranged in the path message. The route object includes specific information pertaining to the input port 201 of the adjacent transmission apparatus #2, specific information pertaining to the input port 301 of the transmission apparatus #3, and specific information pertaining to the input port 410 of the transmission apparatus #4. That is, the route object (d) includes an ERO subobject (d1) that specifies the input port number of the transmission apparatus #2 as "201", a label subobject (d2) that specifies "X" as the label (i.e., indicating that X is to be secured as the band in use), an ERO subobject (d3) that specifies the input port 301 of the transmission apparatus #3, a label subobject (d4) that specifies the band of label Y, an ERO subobject (d5) that specifies the input port 401 of the transmission apparatus #4, and a label subobject (d6) that specifies the band of label Z.

In the following, standby channel route establishing operations are described with reference to FIGS. 4A and 4B. It is noted that operations that differ from those performed for the active channel route are described below. Specifically, after operations substantially identical to the operations (1), (2), and (3) of FIG. 3 are performed to obtain standby channel route calculation results from the route calculation unit 1b in response to a standby channel route calculation request, operations (1) through (3) of FIG. 4A and operations (4) and (5) of FIG. 4B are performed as described below.

(1) The signaling unit 1a of FIG. 4 transmits a status update request to the band management table 1c for switching the relevant band information of the transmission apparatus #1 to "pre-reserved".

(2) The band management table 1c switches the band information of the path (connection) of the port to be used to "pre-reserved" and sends a response to the signaling unit 1a.

(3) The signaling unit 1a incorporates route information and pre-reserved band information in a path message, and transmits the path message to an adjacent transmission apparatus of the standby channel route (e.g., transmission apparatus #5 of FIG. 1).

(4) After transmitting the path message, a reserve message generated at the egress transmission apparatus of the network (e.g. transmission apparatus #4 of FIG. 1) and transmitted toward the present ingress transmission apparatus #1 in reverse order of the transmission order for the path message may be received. However, in the present case, band information updating is not performed even when such reserve message is properly received at the transmission apparatus #1 (i.e., the "preserved" status of the band information is maintained).

(5) Since the band information is not changed to "determined (in use)" status, the OSPF unit 1d does not perform information update advertisement to the adjacent transmission apparatus #5 and does not transmit information of the band management table 1c to the route calculation unit 1b.

Figure 6:
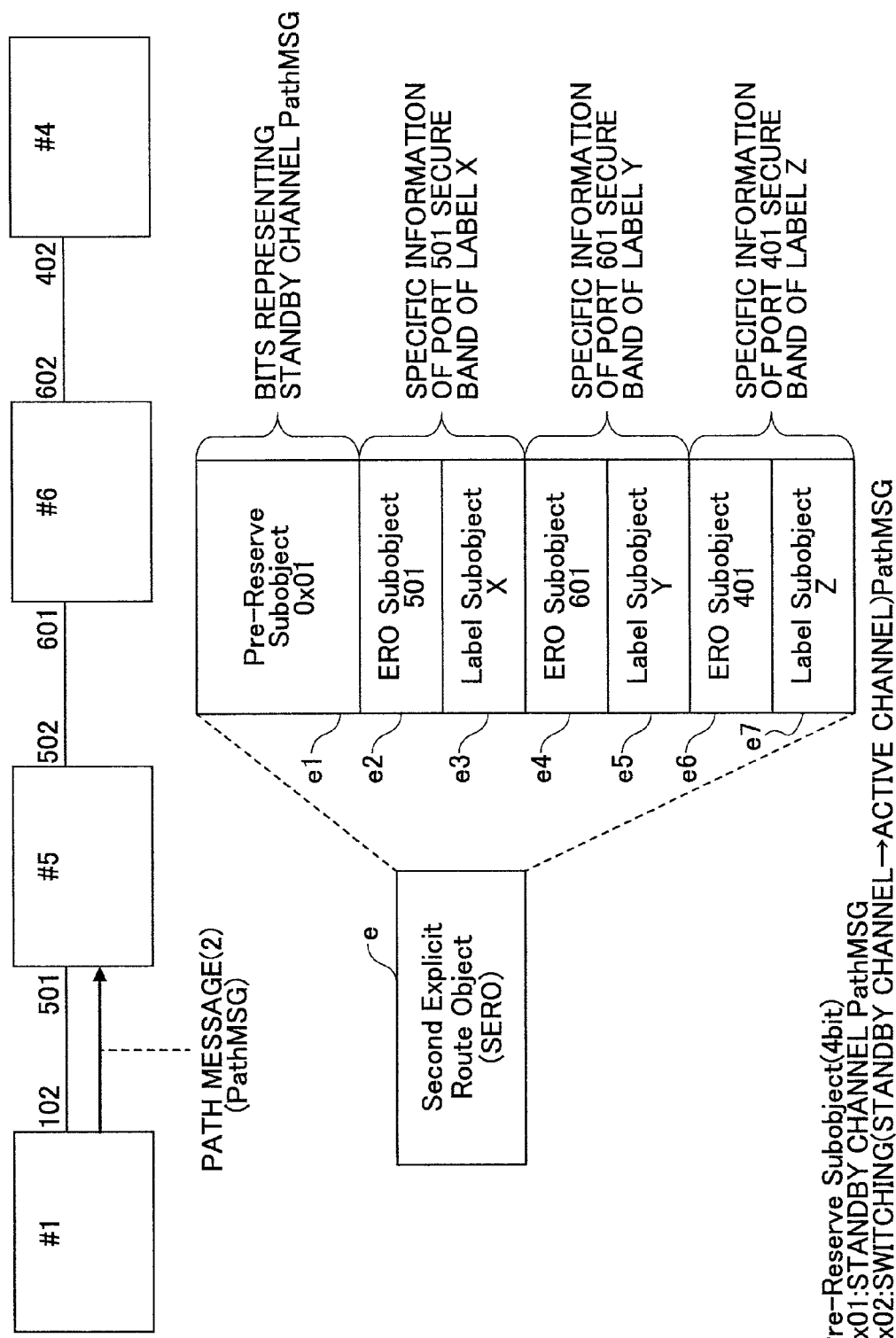
FIG. 6 is a diagram illustrating an exemplary configuration of a secondary explicit route object that is included in a standby channel path message that is transmitted to the standby channel route.

FIG. 6 is a diagram illustrating an exemplary configuration of a secondary explicit route object included in a path message transmitted to the standby channel route.

The illustrated object of FIG. 6 is an extension of the objects included in a conventional path message and is transmitted from the ingress transmission apparatus (#1) to the standby channel route. In the illustrated example, a path message (Path MSG) (2) for forming the standby channel route passing transmission apparatuses #1, #5, #6, and #4 is transmitted from the transmission apparatus #1. The path message (2) has a configuration similar to that shown in FIG. 5 including an IP header, an RSVP header, and plural objects. However, instead of including a route object (ERO) as is shown in FIG. 5 for setting band information to "reserved" status, the path message (2) includes a secondary route object (SERO: Secondary Explicit Route Object) (e) as is shown in FIG. 6 for setting band information to "pre-reserved" status. At the head of the secondary route object, bits (4 bits) identifying the path message as a standby channel (pre-reserve) path message is provided as a pre-reserve subobject (e1). In the illustrated example, the standby channel (pre-reserve) path message is represented by "0x01". It is noted that a switching path message for instructing a switch from the standby channel route to the active channel route may be represented by "0x02", for example.

Also, the second route object (SERO) (e) includes specific information pertaining to the input port 501 of the transmission apparatus #5, specific information pertaining to the input port 601 of the transmission apparatus #6, and specific information pertaining to the input port 402 of the transmission apparatus #4. That is, the second route object (e) includes an ERO subobject (e2) that specifies the input port number (501) of the transmission apparatus #5, a label subobject (e3) that specifies the band to be used (the band of label X is to be pre-reserved in the present example), an ERO subobject (e4) that specifies the input port number (601) of the transmission apparatus #6, a label subobject (e5) that specifies the band of label Y, an ERO subobject (e6) that specifies the input port number (402) of the transmission apparatus #4, and a label subobject (e7) that specifies the band of label Z.

Figure 7:
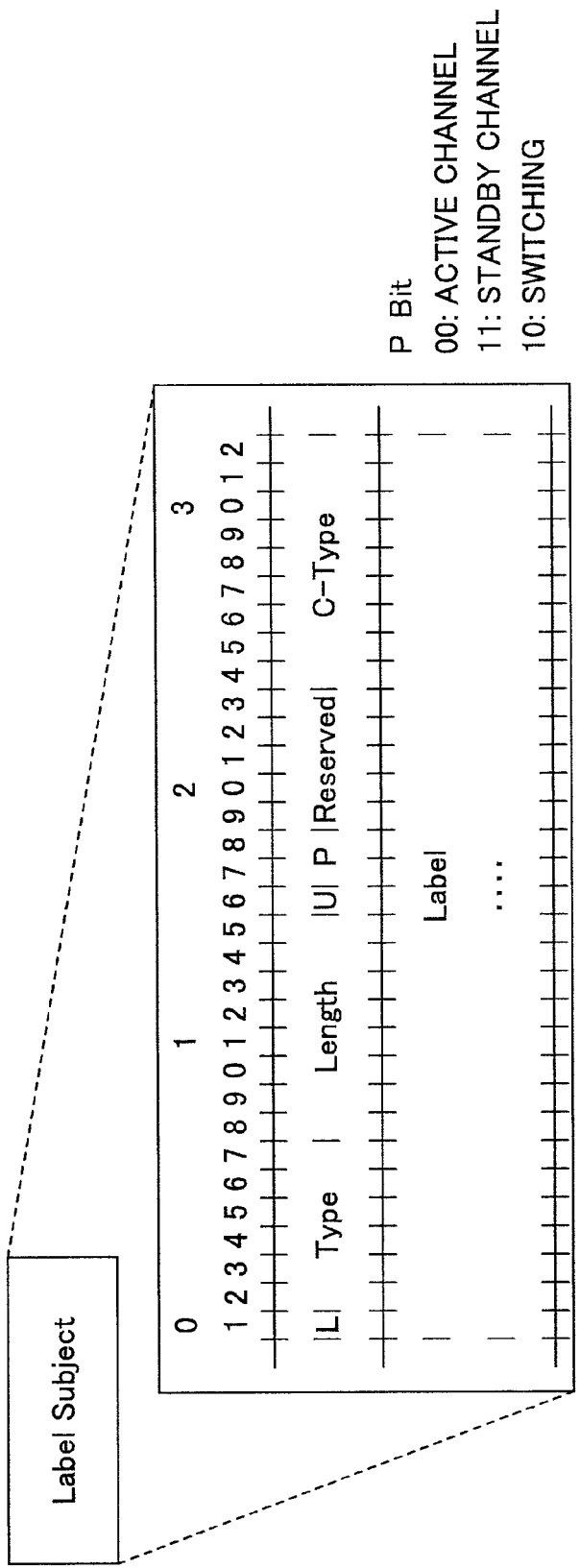
FIG. 7 is a diagram illustrating an exemplary configuration of a label subobject that includes a standby channel path message identifier.

FIG. 7 is a diagram illustrating a configuration for using a label subobject as a standby channel route identifier. It is noted that the present configuration may be used as an alternative to the configuration illustrated in FIG. 6, for example.

The illustrated label subobject of FIG. 7 is included in a second route object (SERO) of a path message, and includes reserved bits that are extended for use as a standby channel route identifier. Specifically, as is shown in FIG. 7, the label subobject is made up of plural lines with each line including 32 bits. The 32 bits of the first line include bits represented by 'L' (1 bit), 'Type' (6 bits), 'Length' (8 bits), 'U' (1 bit), and 'P' (2 bits). The two bits represented by 'P' correspond to reserved bits used for identifying a standby channel route. For example, a path message may be identified as a normal (active channel) path message when the P bits are '00', a standby channel path message when the P bits are '01', and a switching path message when the P bits are '10'.

According to one embodiment, upon initializing a network a selection may be made whether to perform pre-reservation of a standby channel route (i.e. whether to use a standby channel route), and if pre-reservation of a standby channel is to be performed, whether to use bits identifying a path message as a standby channel path message (pre-reserve subobject) included in a second route object as is illustrated in FIG. 6, or use the label subobject as is illustrated in FIG. 7, for example.

Figure 8:
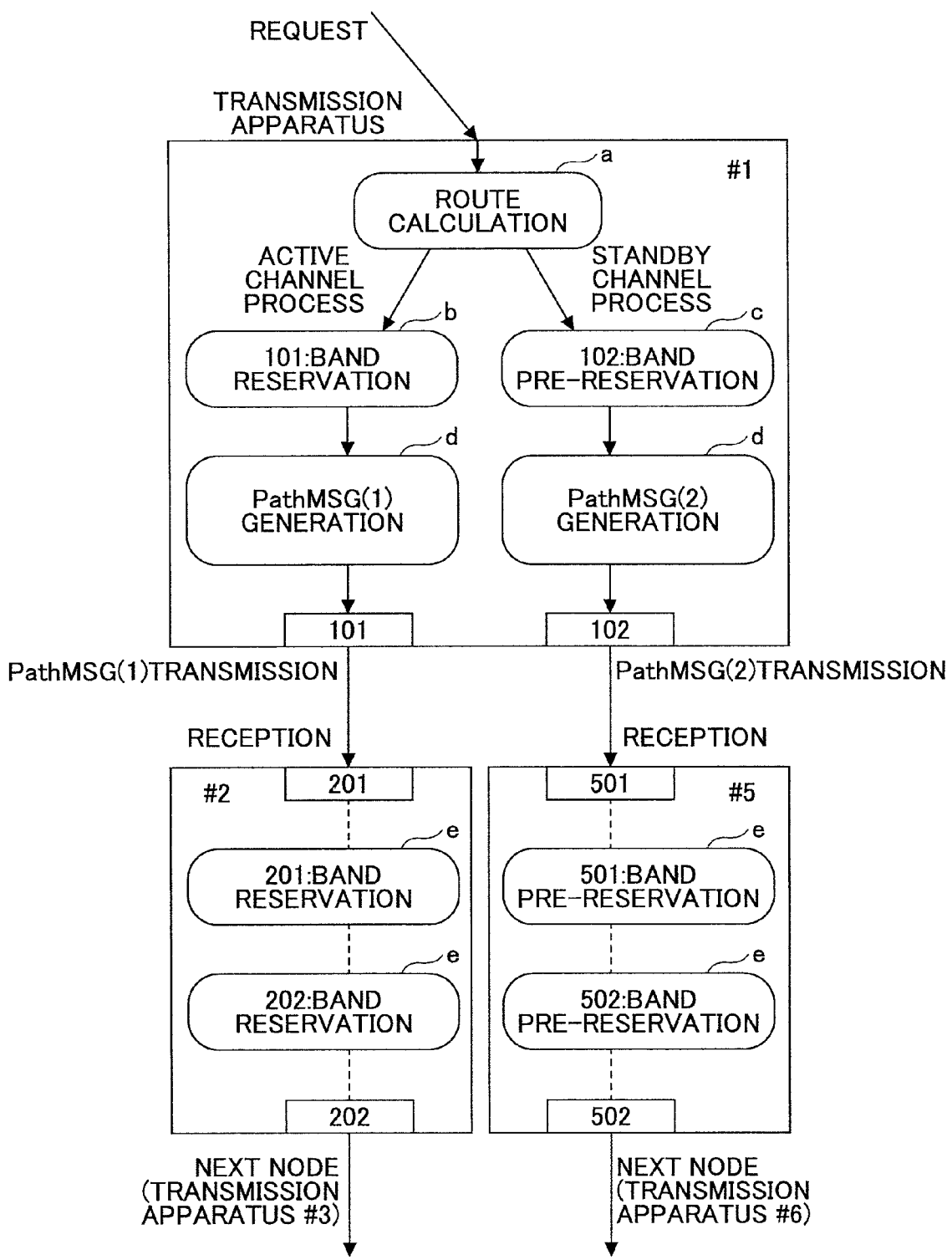
FIG. 8 is a diagram illustrating exemplary band reservation operations.
Figure 9:
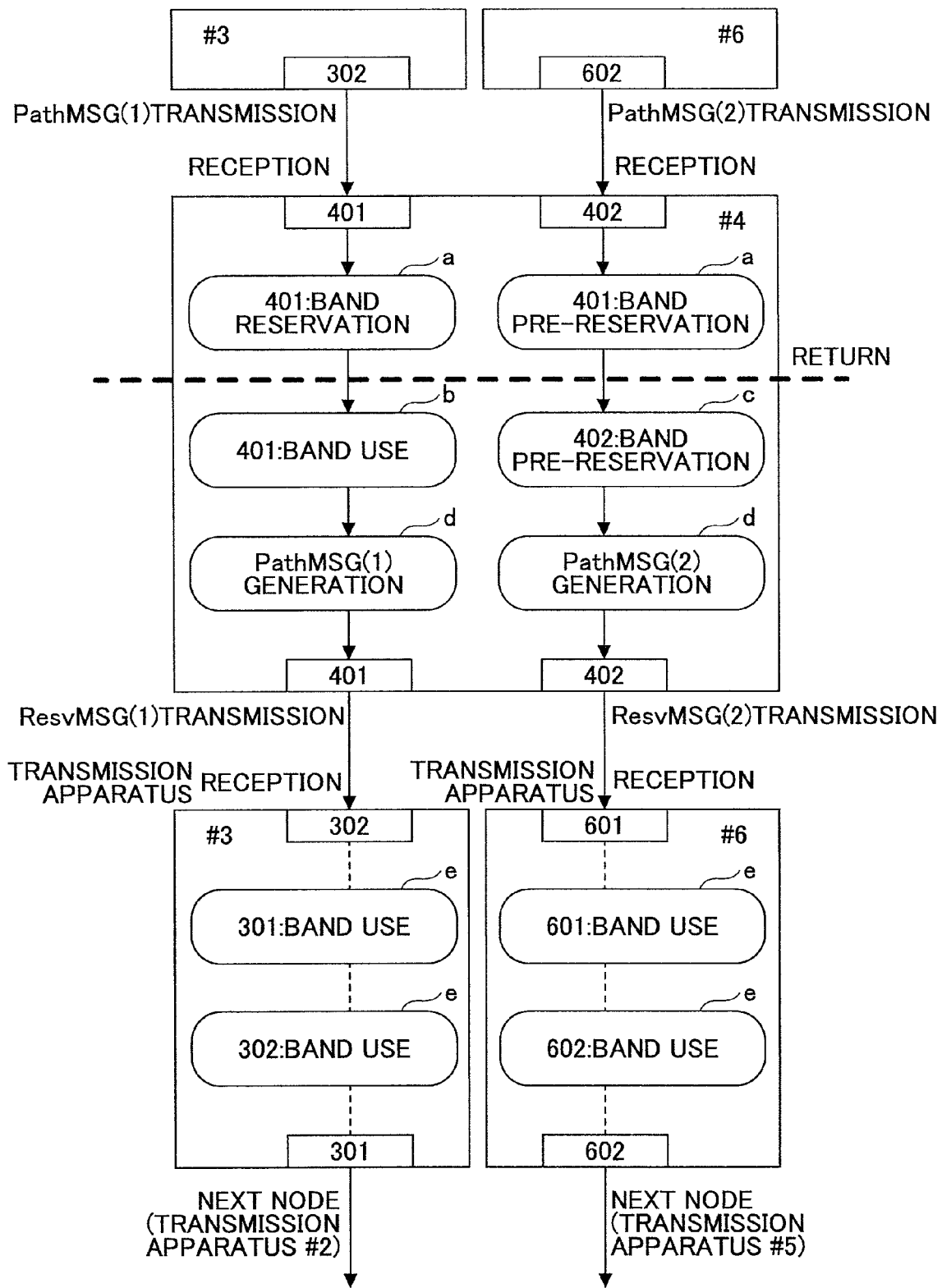
FIG. 9 is a diagram illustrating the band reservation operations continued from FIG. 8.

FIGS. 8 and 9 are diagrams illustrating the process flow of band reservation operations. Specifically, FIG. 8 illustrates transmission of an active channel path message (active channel path establishing message) from the transmission apparatus #1 to the transmission apparatus #2 and transmission of a standby channel path message (standby channel path establishing message) from the transmission apparatus #1 to the transmission apparatus #5 as described below.

a. Upon receiving a request for establishing an active channel and a standby channel, the transmission apparatus calculates routes for the active channel (1) and the standby channel (2).

b. The port 101 of the transmission apparatus #1 forming the active channel route switches the status of a designated band from "free" to "reserved".

c. The port 102 of the transmission apparatus #2 forming the standby channel route switches the status of a designated band from "free" to "pre-reserved".

d. Path messages (Path MSG) (1) and (2) for the active channel route and the standby channel route are generated and the generated path messages (1) and (2) are transmitted to their corresponding next transmission apparatuses from the corresponding ports.

e. Input ports 201 and 501 receiving the path messages (1) and (2), respectively, switch the statuses of relevant bands. Specifically, for the active channel, the statuses of the relevant bands are set to "reserved", and for the standby channel, the statuses of the relevant bands are set to "pre-reserved". The path messages (1) and (2) are then transmitted to the corresponding next transmission apparatuses.

FIG. 9 illustrates transmissions of messages on the active channel route between the transmission apparatuses #3 and #4 and transmissions of messages on the standby channel route between the transmission apparatuses #6 and #4. Overall operations of the message transmissions are described below.

a. Upon receiving the path messages (1) and (2) from the transmission apparatuses #3 and #6, the transmission apparatus #4 switches the statuses of relevant bands to "reserved" and "pre-reserved", respectively.

b. The port 401 designated by the active channel switches the status of the designated band from "reserved" to "in use".

c. The port 402 designated by the standby channel maintains the status of the designated band to "pre-reserved" (i.e. does not change the status of the designated band).

d. Reserve messages (1) and (2) for the active channel and the standby channel are generated and the generated reserve messages (1) and (2) are transmitted to the corresponding next transmission apparatuses from the corresponding ports.

e. Upon receiving the reserve message (1) for the active channel, the port 301 sets the statuses of the relevant bands to "in use (determined)". Upon receiving the reserve message channel (2) for the standby channel, the port 601 maintains the statuses of the relevant bands to "pre-reserved". Then, the ports 301 and 601 respectively transmit the reserve messages (1) and (2) to the corresponding next transmission apparatuses.

FIGS. 10A-10D are diagrams illustrating band update advertisement operations controlled by the OSPF unit 1d of FIG. 3

Figure 10C:
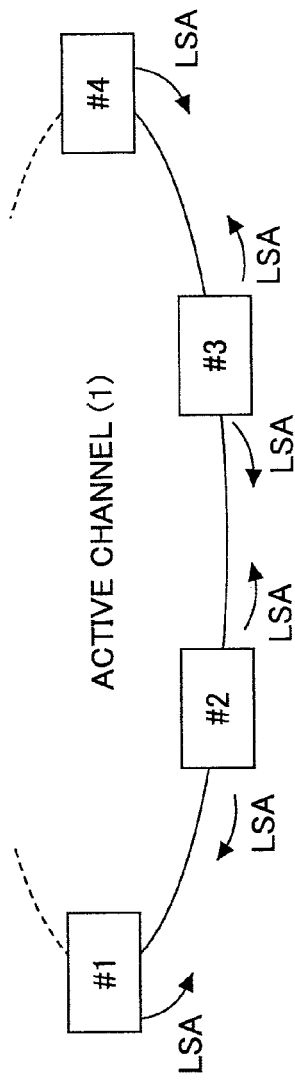
Figure 10D:
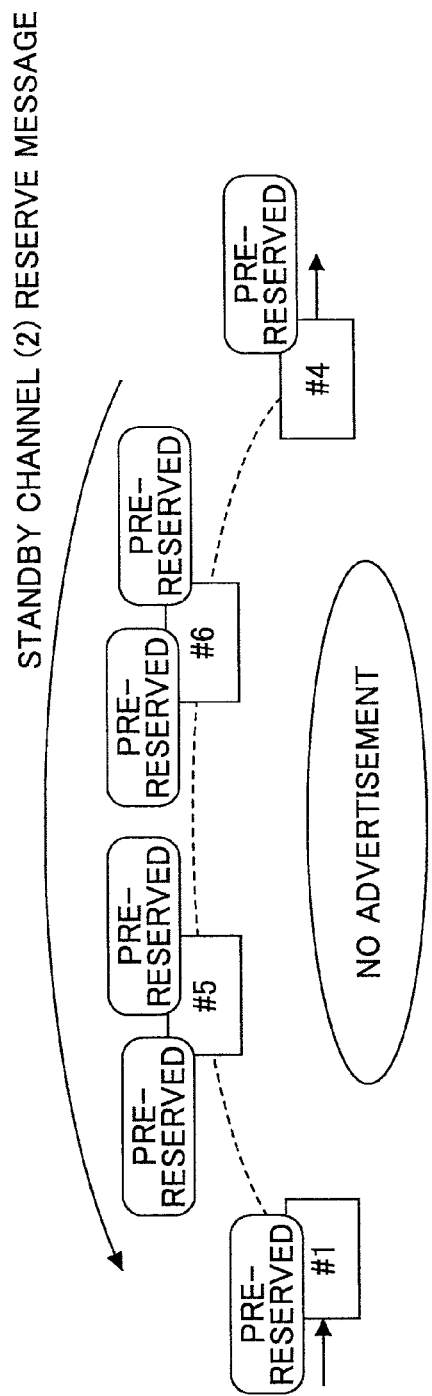

FIG. 10A illustrates signaling of the active channel (1) and the standby channel (2) from transmission apparatus #1 in a network. FIG. 10B illustrates transmitting a reserve message from transmission apparatus #4 to transmission apparatus #1 via the route of the active channel (1) and updating band status information within the transmission apparatuses #4-#1 to "in use (determined)". FIG. 10C illustrates transmission apparatuses of the route of the active channel (1) advertising their updated link information with updated band status information (LSA: Link State Advertising) to their neighboring transmission apparatuses.

FIGS. 11A-11C and FIGS. 12A-12C illustrate operations that may be performed in a case where a transmission apparatus is shared by plural networks. In the example illustrated by these drawings, a first network is formed by transmission apparatuses #1-#4, #6, #5, #1, and a second network is formed by transmission apparatuses #A, #B, #6, #C, #E, #D, #A.

Figure 11A:
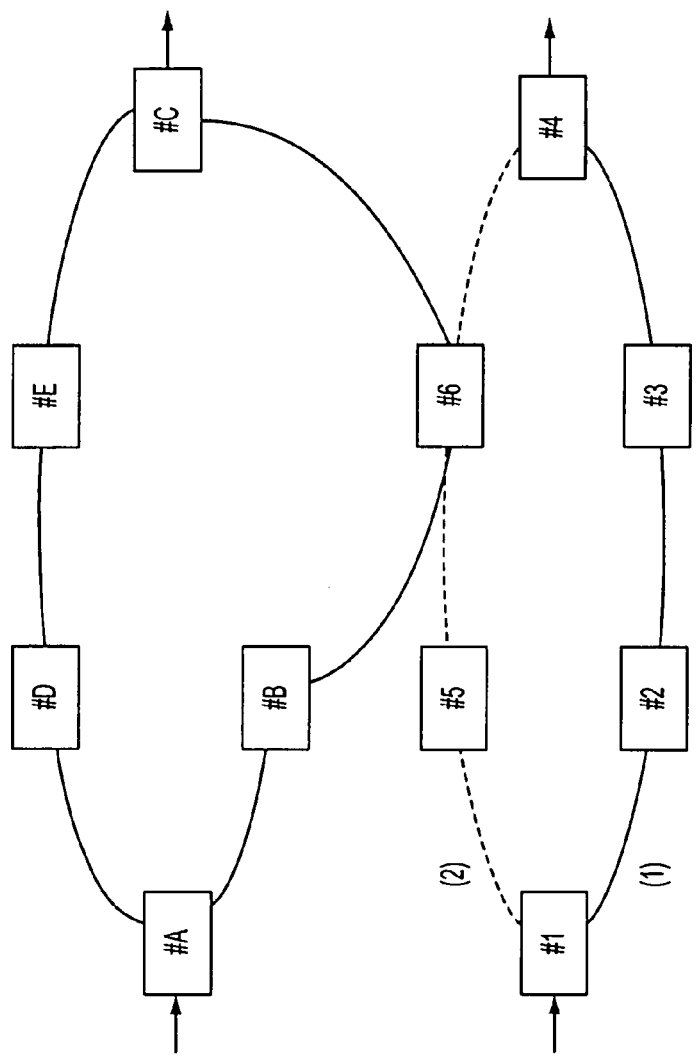
FIGS. 11A-11C are diagrams illustrating exemplary operations performed in a case where a transmission apparatus is shared by plural networks.

Referring to FIG. 11A, in a case where an active route (1) is formed by transmission apparatuses #1, #2, #3, and #4, and a standby route (2) is formed by transmission apparatuses #1, #5, #6, and #4 in the first network with the transmission apparatus #1 as the ingress node and the transmission apparatus #4 as the egress node, the bands of the input port and output port of the transmission apparatus #6 are set to "pre-reserved" but such band update information is not advertised to the other transmission apparatuses so that in calculating an active route for connecting the ingress transmission apparatus #A to the egress transmission apparatus #C of the second network, the paths connecting the transmission apparatuses #B and #C to the transmission apparatus #6 (as well as the paths connecting the transmission apparatuses #5 and #4 to the transmission apparatus #6) may be regarded as "free". Therefore, in the second network, a route passing the transmission apparatuses #A, #B, #6, and #C may be calculated as an active route.

Figure 11B:
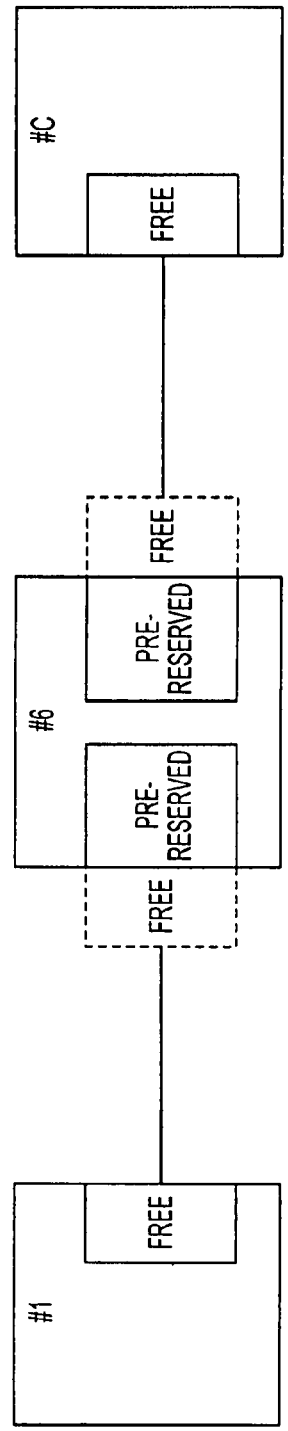

In this case, as is shown in FIG. 11B, the statuses of the ports of the transmission apparatus #6 (i.e. ports for connecting the transmission apparatuses #B and #C to the transmission apparatus #6) are regarded as "free" when route calculation is performed in the second network. In other words, the "pre-reserved" status is merely an internally recognized status and a band set to such a status is regarded as "free" from the outside.

In a case where a route including the transmission apparatus #6 is obtained as the active route of the second network through route calculation, an active channel path message generated at the ingress transmission apparatus #A is transmitted to the transmission apparatus #6 via the transmission apparatus #B. Upon receiving this active path channel message, the transmission apparatus #6 changes the band status information of its ports from "pre-reserved" to "reserved". Specifically, since the transmission apparatus #6 forms a standby channel in the first network, band information of its ports are is set to "pre-reserved". Then, since the ports of the transmission apparatus #6 form an active channel in the second network, the corresponding band information is changed to "reserved" by the active channel path message, and the band information is subsequently changed to "in use" as is described below.

Figure 11C:
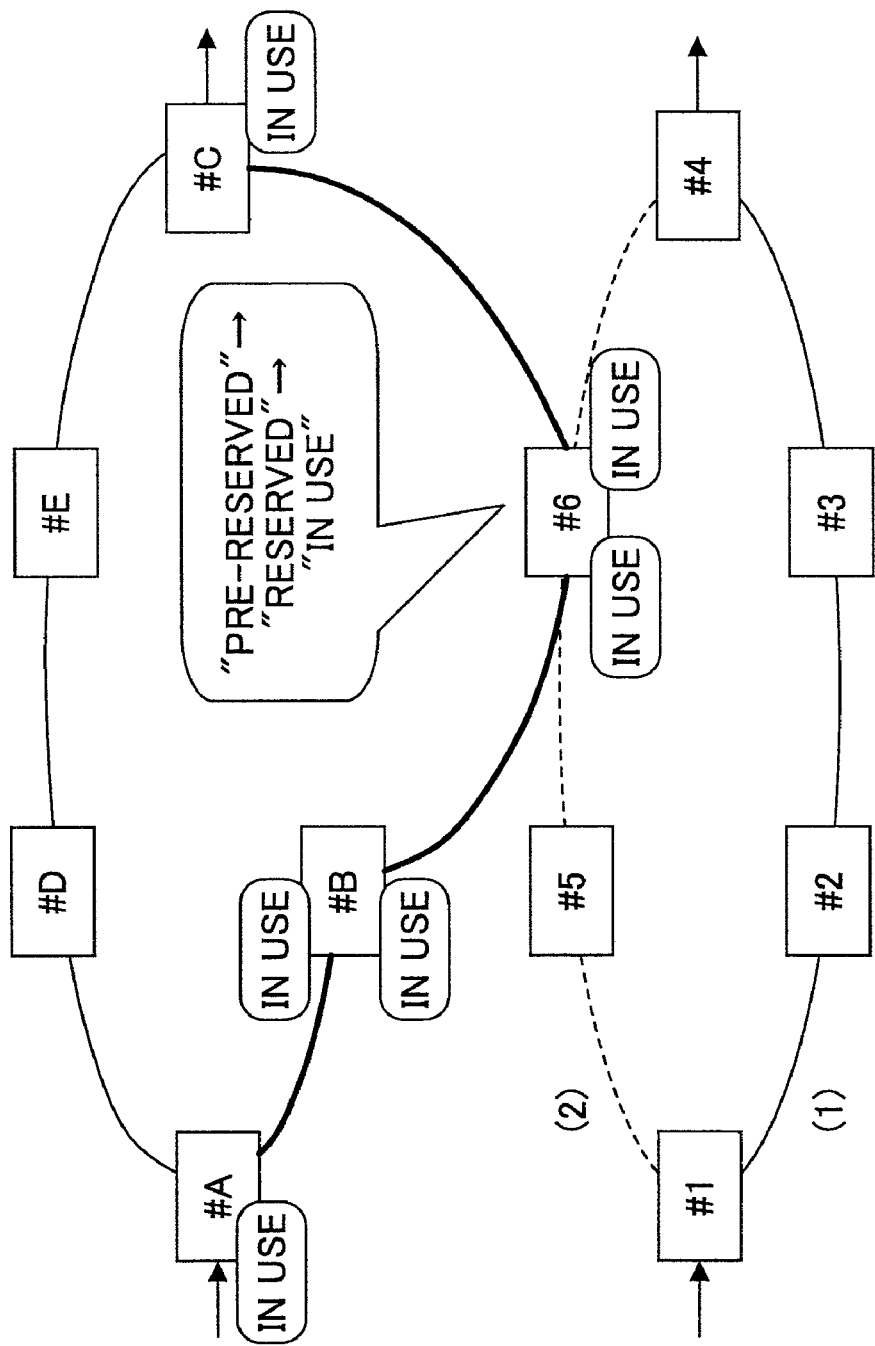

When the active channel path message transmitted from the transmission apparatus #A reaches the egress transmission apparatus #C, a reserve message (Resv MSG) is transmitted from the transmission apparatus #C toward the transmission apparatus #A in reverse order with respect to the transmission order of the path message (i.e. transmission apparatuses #C, #6, #B, #A). As is shown in FIG. 11C, upon receiving the reserve message, the transmission apparatus #6 switches the statuses of the bands previously set to "reserved" to "in use (determined)". It is noted that similar band status information switching operations may also be performed at the other transmission apparatuses #B and #A in response to receiving the reserve message.

Figure 12A:
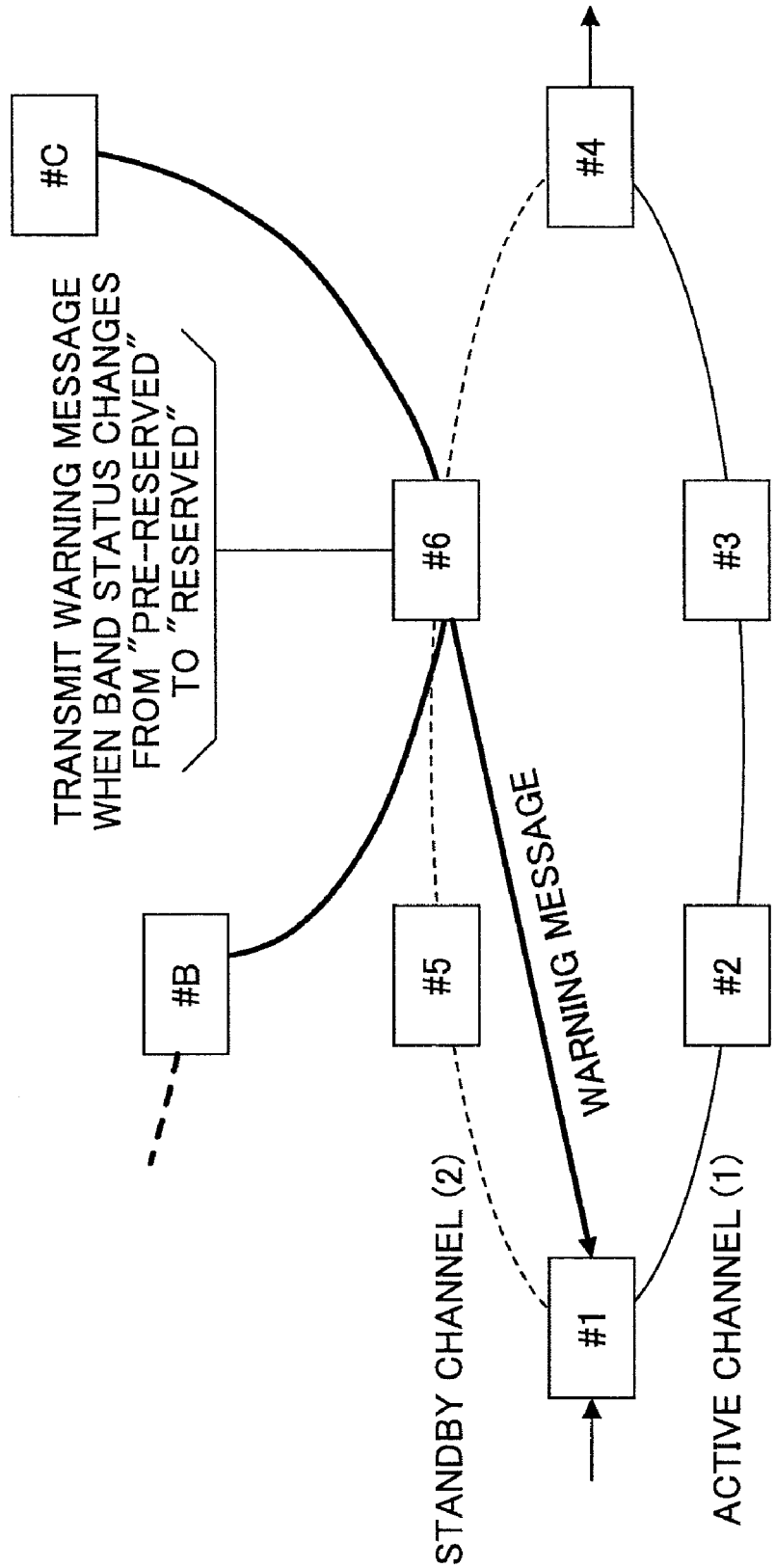
FIGS. 12A-12C are diagrams illustrating the operations continued from FIGS. 11A-11C.

As is shown in FIG. 12A, when the relevant band status information is switched from "pre-reserved" to "reserved", the transmission apparatus #6 detects such a change in the band status information and transmits a warning message to the ingress transmission apparatus #1 of the first network to signal the change in the status of the standby route.

Figure 12B:
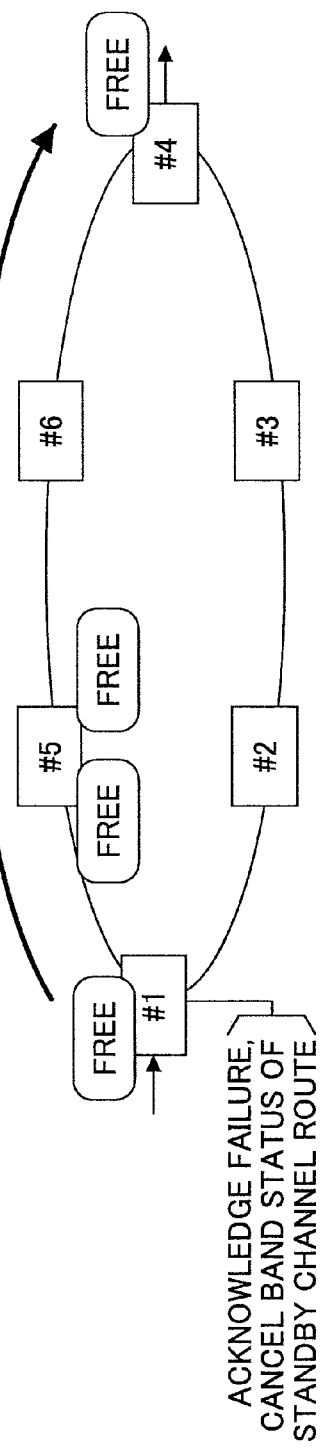

As is shown in FIG. 12B, in response to receiving such a warning message, the transmission apparatus #1 transmits a path cancellation message to the standby channel paths (connections) of the standby channel route formed by the transmission apparatuses #1, #5, #6, and #4 so that the band status information of the relevant bands may be changed from "pre-reserved" to "free". As a result, the bands of the paths of the ports of the transmission apparatuses forming the standby route may be set free.

Figure 12C:
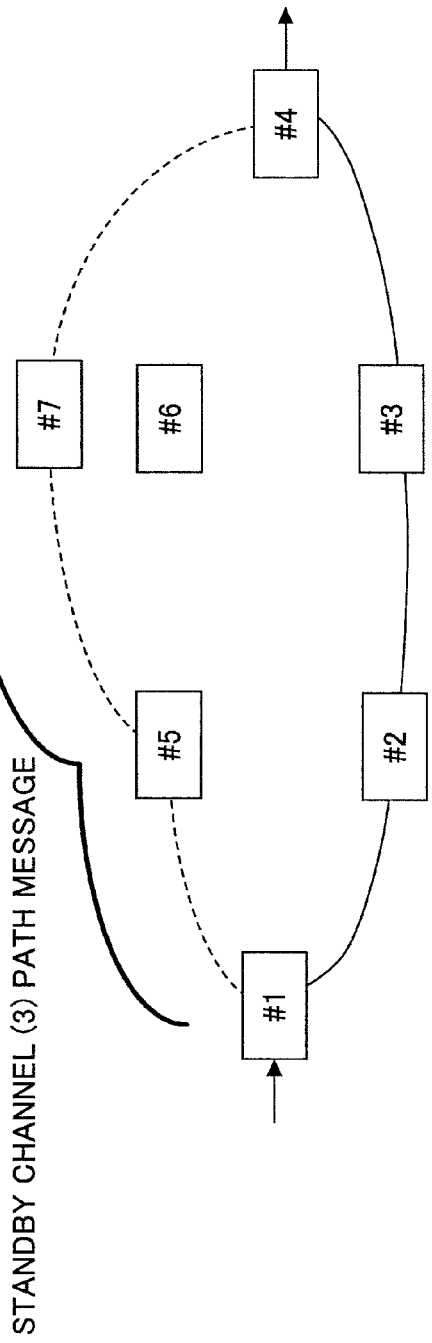

After transmitting the path cancellation message for cancelling the standby channel path, the transmission apparatus #1 executes route calculation for establishing a new standby channel route. For example, as is shown in FIG. 12C, a standby channel path message (Path MSG) may be transmitted to a new route to establish a new standby channel route (3). In the illustrated example, the new standby channel route (3) is formed by transmission apparatuses #1, #5, #7, and #4.

Also, the transmission apparatus #6 transmits a LSA (Link State Advertisement) to its neighboring transmission apparatuses for advertising its band status information change (update) at the point when its band status information is switched to "in use".

FIGS. 13A-13D are diagrams illustrating operations for switching the active channel.

FIG. 13A illustrates a case where paths of the active channel and the standby channel are properly established. Specifically, the statuses of the bands used for the active channel (1) are set to "in use (determined)", and the statuses of the bands used for the standby route are set to "pre-reserved".

As is shown in FIG. 13B, when failure occurs within the active channel, the transmission apparatus #3 detecting the failure transmits a warning message to the transmission apparatus #1. Upon receiving this warning message, the transmission apparatus #1 acknowledges the occurrence of the failure and performs switching processes. Specifically, the transmission apparatus #1 generates a switching path message (Path MSG) for switching the active channel.

As is shown in FIG. 13C, a path cancellation message is transmitted to the current active channel for cancelling the active channel (1), and at the same time, the switching path message is transmitted to the standby route (2).

As is shown in FIG. 13D, when the standby channel route formed by the transmission apparatuses #1, #5, #6, and #4 is switched to become an active channel route by transmitting the switching path message to the transmission apparatuses #5, #6, and #4, the transmission apparatus #1 performs recalculation of the original active channel route formed by the transmission apparatuses #1-#4 to obtain a new standby route. Then, the transmission apparatus #1 transmits a standby channel path message to the newly calculated standby route.

Also, it is noted that the transmission apparatuses that are switched from a standby channel to an active channel by the switching path message in FIG. 13C have their bands switched to "in use" status, and in turn, each of the transmission apparatuses transmit a LSA message to its neighboring transmission apparatuses (nodes) to advertise its updated band information.

FIGS. 14A-14C and FIGS. 15A-15C are diagrams illustrating switching operations performed in a case where plural paths are formed at the same port. FIG. 14A illustrates plural networks that share a common transmission apparatus #6, where a first network is formed by transmission apparatuses #1-#6, and a second network is formed by transmission apparatuses #A-#E and transmission apparatus #6. In FIG. 14A, an active channel route (1) of the first network is formed by the transmission apparatuses #1, #2, #3, and #4, and a standby channel route (2) of the first network is formed by the transmission apparatuses #1, #5, #6, and #4. Also, an active channel route (3) of the second network is formed by the transmission apparatuses #A, #D, #E, and #C, and a standby channel route (4) of the second network is formed by the transmission apparatuses #A, #B, #6, and #C. In the present example, the transmission apparatus #6 forms standby channel routes for two networks. In this case, in the transmission apparatus #6, two routes use the same port to establish standby channels. Specifically, as is shown in FIG. 14C, two standby channel routes (2) and (4) use the same channel (CH1) of port 601 of the transmission apparatus #6. Since the two routes (2) and (4) correspond to standby channel routes, the corresponding band of port 601 is set to "pre-reserved". FIG. 14B illustrates information described in the band management table for the port (interface index) 601 of the transmission apparatus #6 in the present case. Specifically, in the band management table for port 601 shown in FIG. 14B, the two routes are identified by connection IDs (2) and (4); the transmission apparatus #1 is identified as the ingress node for the connection ID (2); CH1 is set to "pre-reserved", CH2 is set to "free", and CH3 is set to "in use" as band information for the connection ID (2); the transmission apparatus #A is identified as the ingress node for the connection ID (4); and the same band information for the connection ID (2) is described as band information for the connection ID (4).

Figure 15C:
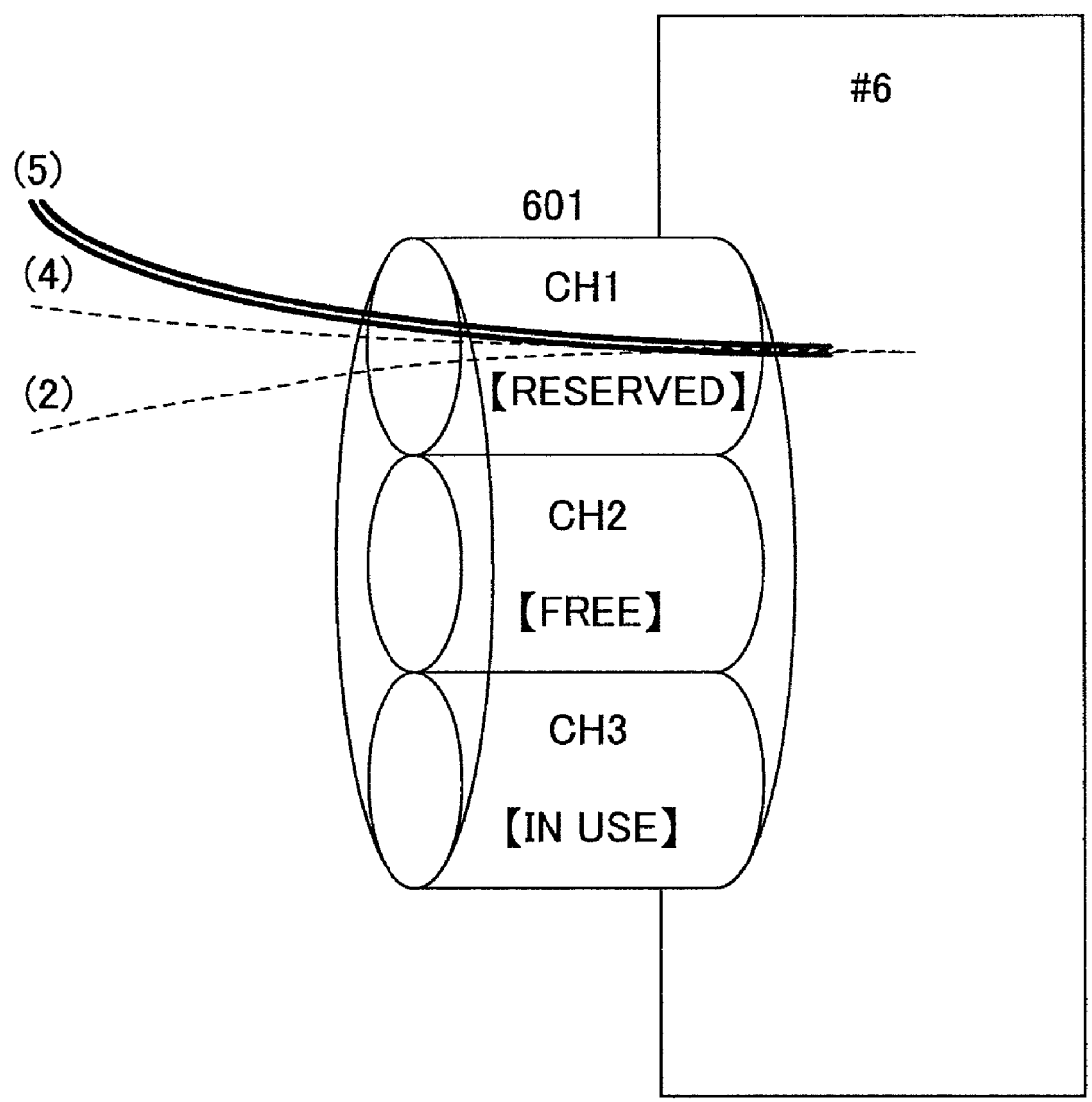
Figure 16:
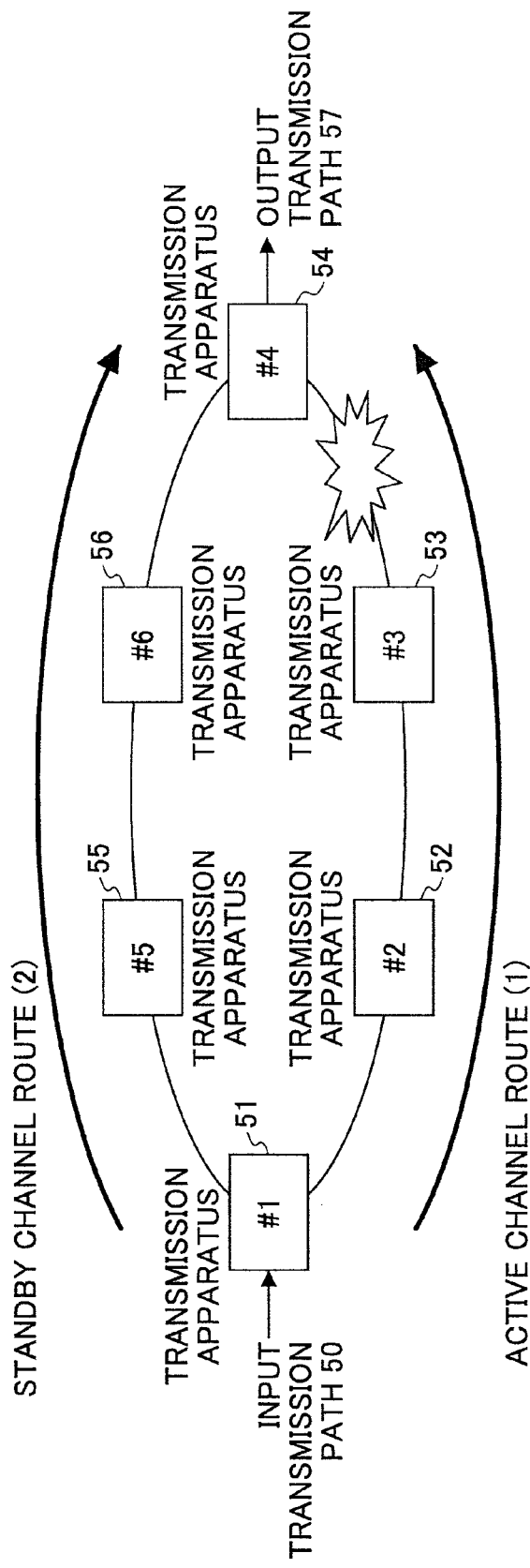
FIG. 16 is a diagram illustrating a basic configuration of a GMPLS network.

FIG. 15A illustrates a case where a new network made up of transmission apparatuses #α, #β, #γ, and #6 is added to the network configuration shown in FIG. 14A. In this example, an active channel route (5) is formed by the transmission apparatuses #α, #≠, and #γ, and a standby channel route (6) is formed by the transmission apparatuses #α, #β, and #γ. When a path of the active channel (5) of this new network is established on the channel CH1 of the port 601 of the transmission apparatus #6 by a corresponding path message transmitted from the transmission apparatuses #α, the band status of the path is switched from "pre-reserved" to "reserved" as is shown in FIGS. 15B and 15C. In turn, in accordance with the operations principle illustrated in FIG. 12D, a warning message for route (2) and a warning message for route (4) are respectively transmitted to the ingress transmission apparatuses #1 and #A of the standby channel routes (2) and (4) that have previously set the status of the channel CH1 of the port 601 to "pre-reserved". Upon receiving the warning messages, the transmission apparatuses #1 and #A respond to the warning messages by transmitting path cancellation messages to the connections (connection IDs) forming their corresponding standby channel routes (2) and (4) so that the statuses of the relevant bands may be switched from "pre-reserved" to "free" and starting route calculation operations for calculating new standby routes.

As is shown in FIG. 15B, in response to the addition of the new network, a new connection ID (5) and data pertaining to the new connection are added to the band management table of port 601. Specifically, band information setting the status of the channel CH1 to "reserved" is added, for example. In turn, the routes (2) and (4) that have been using the channel CH1 to establish "pre-reserved" standby channels transmit warning messages addressed to their corresponding ingress nodes registered in the present table. Then, upon receiving path cancellation messages from the ingress transmission apparatuses #1 and #A, the standby routes (2) and (4) delete their corresponding data including their connection IDs from the band management table.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-233076 filed on Aug. 30, 2006, the entire contents of which are hereby incorporated by reference.

What is claimed is:

1. A control method for controlling establishment of a standby channel route for an active channel route in a network made up of a plurality of transmission apparatuses including an ingress transmission apparatus, an egress transmission apparatus, at least one active channel route transmission apparatus, and at least one standby channel route transmission apparatus, wherein the standby channel route is formed by the standby channel route transmission apparatus, the ingress transmission apparatus, and the egress transmission apparatus, the control method comprising:

transmitting from the ingress transmission apparatus to the active channel route transmission apparatus an active channel path establishing message including reserve information for directing the active channel route transmission apparatus to reserve an active channel path of the active channel route;

setting the active channel path to an in-use status within a band management table of the ingress transmission apparatus when the ingress transmission apparatus receives a reserve message generated by the egress transmission apparatus in response to the active channel path establishing message;

transmitting from the ingress transmission apparatus to the standby channel route transmission apparatus a standby channel path establishing message including pre-reserve information for directing the standby channel route transmission apparatus to pre-reserve a standby channel path of the standby channel route; and setting the standby channel path to a pre-reserved status within a band management table of the standby channel route transmission apparatus when the standby channel route transmission apparatus receives the standby channel path establishing message;

wherein the standby channel path that is set to the pre-reserved status within the band management table of the standby channel route transmission apparatus is externally recognized as being in a free status by the transmission apparatuses other than the standby channel route transmission apparatus, wherein, when a band used by the standby channel path of the standby channel route is determined to be used by another active channel path of another active channel route of another network including the standby channel route transmission apparatus, another ingress transmission apparatus, and another egress transmission apparatus, the pre-reserved status of the standby channel path within the band management table of the standby channel route transmission apparatus is canceled, and route calculation is executed to obtain a new standby channel route.

2. The control method as claimed in claim 1, wherein, when the standby channel path is set to the pre-reserved status within the band management table of the standby channel route transmission apparatus, the standby channel route transmission apparatus that receives the reserve message transmitted from the egress transmission apparatus maintains the pre-reserved status of the standby channel path and abstains from advertising updated information of the band management table.

3. The control method as claimed in claim 1, wherein a band used by the standby channel path that is set to the pre-reserved status within the band management table of the standby channel route transmission apparatus is simultaneously pre-reserved for use by another standby channel route path of another standby channel route of another network including the standby channel route transmission apparatus, another ingress transmission apparatus, and another egress transmission apparatus.

4. The control method as claimed in claim 1, wherein the pre-reserve information for directing the standby channel route transmission apparatus to pre-reserve the standby channel path is identified by a bit array arranged at a head of a secondary explicit route object of the standby channel path establishing message.

5. The control method as claimed in claim 1, wherein the pre-reserve information for directing the standby channel route transmission apparatus to pre-reserve the standby channel path is identified by reserved bits included in a label subobject of the standby channel path establishing message.

6. A control method for controlling establishment of a standby channel route for an active route in a network made up of a plurality of transmission apparatuses including an ingress transmission apparatus, an egress transmission apparatus, at least one active channel route transmission apparatus, and at least one standby channel route transmission apparatus, wherein the standby channel route is formed by the ingress transmission apparatus, the egress transmission apparatus, and the standby channel route transmission apparatus, the control method comprising:

transmitting from the ingress transmission apparatus to the active channel route transmission apparatus an active channel path establishing message including reserve information for directing the active channel route transmission apparatus to reserve an active channel path of the active channel route;

setting the active channel path to an in-use status within a band management table of the ingress transmission apparatus when the ingress transmission apparatus receives a reserve message generated by the egress transmission apparatus in response to the active channel path establishing message;

selecting, prior to transmission of a standby channel path establishing message from the ingress transmission apparatus to the standby channel route transmission apparatus, whether to pre-reserve a standby channel path of the standby channel route, and whether to use a bit array arranged at a head of a secondary explicit route object of the standby channel path establishing message or reserved bits included in a label subobject of the standby channel path establishing message to identify pre-reserve information for directing the standby channel route transmission apparatus to pre-reserve the standby channel path; and setting the standby channel path to a pre-reserved status within a band management table of the standby channel route transmission apparatus when the standby channel route transmission apparatus receives the standby channel path establishing message;

wherein the standby channel path that is set to the pre-reserved status within the band management table of the standby channel route transmission apparatus is externally recognized as being in a free status by the transmission apparatuses other than the standby channel route transmission apparatus, wherein, when a band used by the standby channel path of the standby channel route is determined to be used by another active channel path of another active channel route of another network including the standby channel route transmission apparatus, another ingress transmission apparatus, and another egress transmission apparatus, the pre-reserved status of the standby channel path within the band management table of the standby channel route transmission apparatus is canceled, and route calculation is executed to obtain a new standby channel route.

7. The control method as claimed in claim 1, wherein, when failure occurs within the active channel route, the active channel route transmission apparatus that detects the failure transmits a warning message to the ingress transmission apparatus, the ingress transmission apparatus receiving the warning message transmits an active channel route switching path message to the standby channel route transmission apparatus, and the standby channel route transmission apparatus receiving the active channel route switching path message updates information of the band management table pertaining to the standby channel path, switches the standby channel route into a new active channel route, and advertises the updated information of the band management table to the transmission apparatuses other than the standby channel route transmission apparatus.

8. The control method as claimed in claim 7, wherein the ingress transmission apparatus transmits a path cancellation message to the active channel route transmission apparatus when the failure occurs within the active channel route, updates information on the active channel path of the active channel route, and executes route calculation based on the updated information to obtain a new standby channel route.

9. The control method as claimed in claim 1, wherein a warning message is issued when the new standby channel route is not obtained by the route calculation.

* * * * *